United States Patent
Kuo et al.

(10) Patent No.: US 9,178,590 B2
(45) Date of Patent: Nov. 3, 2015

(54) CHANNEL INFORMATION FEEDBACK METHOD AND WIRELESS COMMUNICATION DEVICE USING THE SAME

(75) Inventors: Ping-Heng Kuo, Pingtung County (TW); Hsiang-Tsung Kung, Taipei (TW); Pang-An Ting, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 554 days.

(21) Appl. No.: 13/338,207

(22) Filed: Dec. 27, 2011

(65) Prior Publication Data

US 2013/0163645 A1     Jun. 27, 2013

(51) Int. Cl.
| | |
|---|---|
| *H04B 1/38* | (2015.01) |
| *H04L 5/16* | (2006.01) |
| *H04B 7/04* | (2006.01) |
| *H04L 25/03* | (2006.01) |
| *H04B 7/06* | (2006.01) |

(52) U.S. Cl.
CPC ............ *H04B 7/0478* (2013.01); *H04B 7/0663* (2013.01); *H04L 25/03949* (2013.01); *H04B 7/0617* (2013.01)

(58) Field of Classification Search
CPC .. H04B 7/0663; H04B 7/0617; H04B 7/0478; H04L 25/03949
USPC .......................................... 375/219, 224, 267
See application file for complete search history.

(56) References Cited

U.S. PATENT DOCUMENTS

| | | | |
|---|---|---|---|
| 5,966,183 A | * | 10/1999 | Kondo et al. .................. 348/458 |
| 7,486,655 B2 | | 2/2009 | Ting et al. |
| 7,492,829 B2 | | 2/2009 | Lin et al. |

(Continued)

FOREIGN PATENT DOCUMENTS

TW     201125382     7/2011

OTHER PUBLICATIONS

Romberg, J.; "An overview of recent results on the identification of sparse channels using random probes," 49th IEEE Conference on Decision and Control (CDC), Dec. 15-17, 2010, pp. 2936-2941.*

(Continued)

*Primary Examiner* — Shuwang Liu
*Assistant Examiner* — Nader Bolourchi
(74) *Attorney, Agent, or Firm* — Jianq Chyun IP Office

(57) ABSTRACT

A channel information feedback method for multi-antenna system, and a wireless communication device using the same method are provided. The proposed method could reduce feedback overhead for multiple-input multiple-output (MIMO) wireless channel information, and is based on compressive sensing technique. Prior to sending back channel information, a receiver estimates the channel and multiplies the vectorized channel with a random matrix to generate compressed feedback content. Upon receiving the compressed feedback content at a transmitter, the channel information could be restored with signal recovery algorithms of compressive sensing technique. In the other embodiment, the proposed method further adaptively adjusts compression ratio of the compressed feedback content in accordance to the prevailing channel quality. Further, for slow-varying MIMO channels, there is proposed another channel information feedback method which switches between a fixed sparcifying-basis and a signal-dependent sparcifying-basis.

19 Claims, 16 Drawing Sheets

(56) References Cited

U.S. PATENT DOCUMENTS

| | | | |
|---|---|---|---|
| 7,676,007 | B1 | 3/2010 | Choi et al. |
| 7,689,177 | B2 | 3/2010 | Kim et al. |
| 7,817,739 | B2 | 10/2010 | Wennstrom et al. |
| 7,881,247 | B2 | 2/2011 | Pan et al. |
| 7,961,775 | B2 | 6/2011 | Kent et al. |
| 7,961,802 | B2 | 6/2011 | Li et al. |
| 2008/0129560 | A1* | 6/2008 | Baraniuk et al. ............. 341/87 |
| 2009/0323851 | A1 | 12/2009 | Ling et al. |
| 2010/0046655 | A1 | 2/2010 | Lee et al. |
| 2010/0087742 | A1* | 4/2010 | Bishop et al. ............. 600/481 |
| 2011/0286498 | A1* | 11/2011 | Abrishamkar et al. ....... 375/148 |
| 2011/0286507 | A1* | 11/2011 | Yu et al. ................... 375/224 |
| 2013/0070624 | A1* | 3/2013 | Nguyen et al. ............. 370/252 |
| 2013/0128932 | A1* | 5/2013 | Huang et al. ............. 375/219 |

OTHER PUBLICATIONS

Li et al., "Novel schemes of CQI Feedback Compression based on Compressive Sensing for Adaptive OFDM Transmission", KSII Transactions on Internet and Information Systems, vol. 5, No. 4, Apr. 2011, 703~719.

Davis et al., "Multi-antenna Downlink Broadcast using Compressed-Sensed Medium Access", in Proc. IEEE Int. Conf. Commun. (ICC), May 23-27, 2010.

Qaseem et al., "Compressive Sensing for Reducing Feedback in MIMO Broadcast Channels", in Proc. IEEE Int. Conf. Commun. (ICC), May 23-27, 2010.

"Office Action of Taiwan Counterpart Application", issued on Mar. 24, 2014, p. 1-p. 10.

\* cited by examiner

CHANNEL INFORMATION FEEDBACK METHOD AND WIRELESS COMMUNICATION DEVICE USING THE SAME

TECHNICAL FIELD

The disclosure generally relates to a channel information feedback method for multi-antenna system, and a wireless communication device using the same method.

BACKGROUND

Many recent researches have found that by equipping transmitters of wireless communication systems with large antenna arrays, huge array gain can be attained and high data rate can be achieved with very low transmission power. Such communication scheme, known as Massive-MIMO, is a promising technique for future wireless communication systems due to its high power efficiency. However, the benefits of Massive-MIMO are mainly attributed to the availability of channel state information (CSI) at the transmitter. Many MIMO techniques, including beamforming, channel inversion, adaptive power/bit allocations, and interference alignment, require the transmitter to possess certain spatial channel information. Hence, most of the relevant research works in this context has focused on time-division duplex (TDD) schemes as channel information can be acquired by the transmitter by exploiting channel reciprocity. Additional feedback mechanism is required for frequency-division duplex (FDD) systems, and apparently feedback overhead is a formidable challenge for Massive-MIMO due to the large number of antennas. In order to realize Massive-MIMO under FDD mode, a more efficient channel information feedback mechanism for Massive-MIMO should be designed.

Most of the prevalent MIMO communication standards, such as LTE-A and WiMAX, employ codebook-based approaches to reduce feedback burdens. A codebook which consists of multiple entries should be pre-configured and stored at both the transmitter and the receiver. Each index of the codebook maps to a quantized version of MIMO spatial channel information. Therefore, feedback volume can be tremendously reduced by merely sending the index of the codebook entry that provides the most appropriate representation of the current channel structure.

Codebook-based quantization approach may work properly for moderate MIMO systems with two to eight antennas. For Massive-MIMO with numerous antennas, however, the codebook size has to be expanded extensively to capture all prospective spatial channel structures. This makes codebook design much more difficult. Apparently, expansion of codebook size also leads to heavier feedback overhead. On the other hand, the intrinsic quantization errors of codebook-based approach may not be acceptable for massive MIMO-based green radio techniques that aim to save transmission power via precise beamforming.

SUMMARY

A channel information feedback method is introduced herein. According to an exemplary embodiment, the channel information feedback method is adapted to a multi-antenna system, and includes following steps: estimating, at a wireless communication device, parameters of a MIMO channel based on signals received from a transmitter, and obtaining an estimated MIMO channel representation; applying compressive sensing technique, at the wireless communication device, to take random measurements of the estimated MIMO channel representation by a pre-configured random matrix, so as to obtain compressive sensing measurements; and feeding back the compressive sensing measurements to the transmitter from the wireless communication device.

A wireless communication device is introduced herein. According to an exemplary embodiment, the wireless communication device includes a transceiver module, a channel estimator, and a baseband processor. The transceiver module is configured for receiving signals from a transmitter and transmitting signals to the transmitter. The channel estimator is connected to the transceiver module, and configured for estimating parameters of a MIMO channel based on signals received from the transmitter, and obtaining an estimated MIMO channel representation. The baseband processor is connected to the transceiver module and the channel estimator, and configured for applying compressive sensing technique to take random measurements of the estimated MIMO channel representation by a random matrix, so as to obtain compressive sensing measurements, and feeding back the compressive sensing measurements to the transmitter through the transceiver module.

A channel information feedback method is introduced herein. According to an exemplary embodiment, the channel information feedback method is adapted to a multi-antenna system, and includes following steps: transmitting, at the wireless communication device, signals to a receiver through a MIMO channel; receiving, at the wireless communication device, compressive sensing measurement parameters of the MIMO channel from the receiver; applying compressive sensing technique, at the wireless communication device, to recover the parameters of the MIMO channel by using a N×N sparcifying basis and a M×N pre-configured random matrix, wherein M<N, N=$N_t \times N_r$, $N_t$ is the number of transmitting antenna at the wireless communication device, and $N_r$ is the number of receiving antenna at the receiver; and applying, at the wireless communication device, transmission parameters for a next session based on the recovered MIMO channel in transmission of signals.

A wireless communication device is introduced herein. According to an exemplary embodiment, the wireless communication device includes a transceiver module, and a communication protocol module. The transceiver module, configured for transmitting signals to a receiver through MIMO channel and receiving signals from the receiver. The communication protocol module is connected to the transceiver module, and configured for receiving compressive sensing measurement parameters of the MIMO channel from the receiver, applying compressive sensing technique to recover the parameters of the MIMO channel by using a N×N sparcifying basis and a M×N pre-configured random matrix, and applying transmission parameters for a next session based on the recovered MIMO channel, wherein M<N, N=$N_t \times N_r$, $N_t$ is the number of transmitting antenna at the wireless communication device, and $N_r$ is the number of receiving antenna at the receiver.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EXEMPLARY EMBODIMENTS

Figure 1:
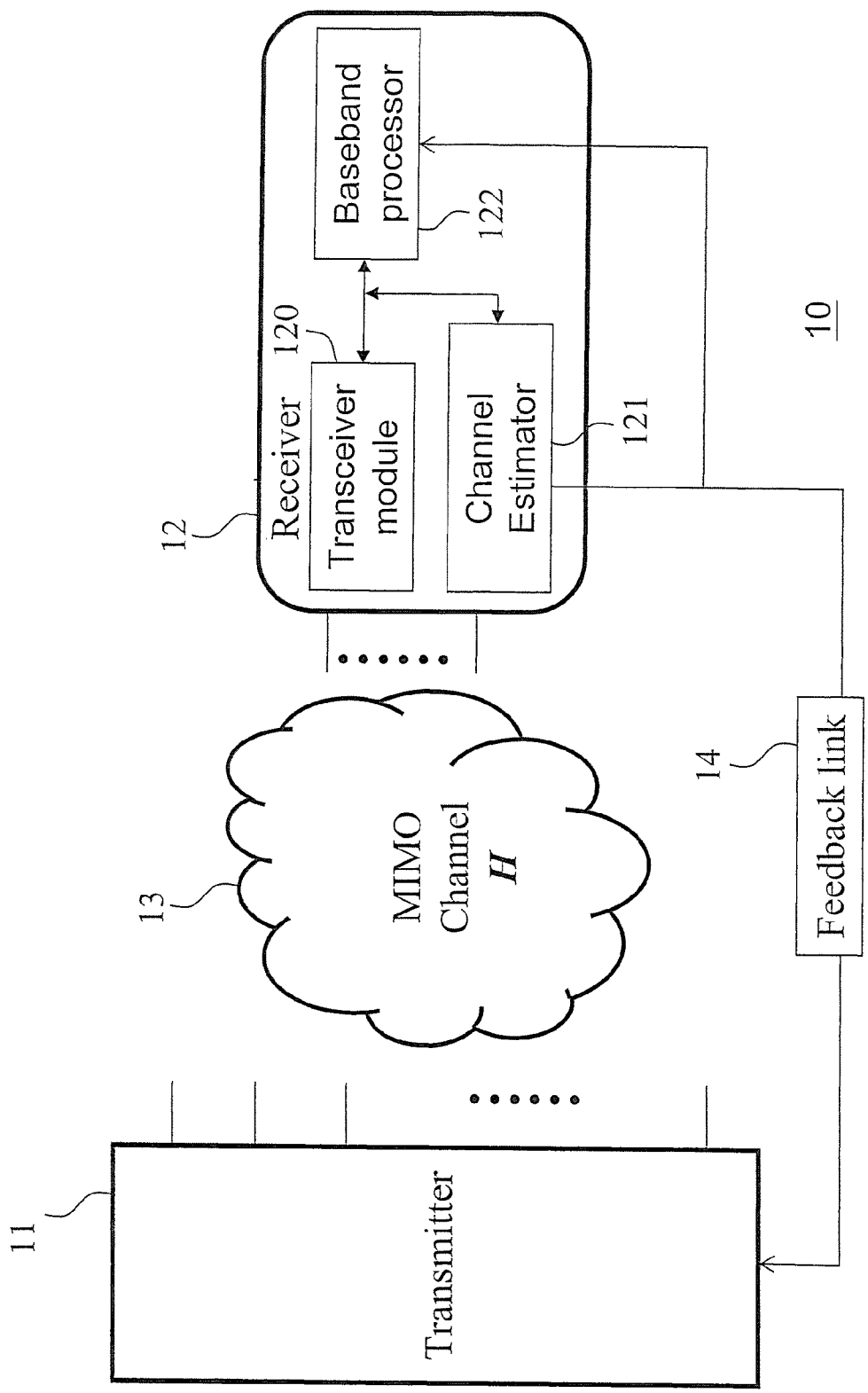
FIG. 1 illustrates a general channel information feedback scenario for a Massive-MIMO communication system.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Throughout the disclosure, the wireless communication device could refer to a user equipment (UE), a mobile station, an advanced mobile stations, a wireless terminal communication device, a M2M device, a MTC device, and so forth. The wireless communication device can be, for example, a digital television, a digital set-top box, a personal computer, a notebook PC, a tablet PC, a netbook PC, a mobile phone, a smart phone, a water meter, a gas meter, an electricity meter, an emergency alarm device, a sensor device, a video camera, and so forth. Also, the wireless communication device could refer to a base station (BS), an advanced base station (ABS), a node B, an enhanced node B (eNB), and so forth.

In the present disclosure, there are proposed a channel information feedback method for multi-antenna system, and a wireless communication device and a base station using the same method.

Instead of employing pre-configured codebooks, the proposed channel information feedback method applies compressive sensing technique to contract the feedback overhead of channel information. In some embodiments of the present disclosure, it is presumed that strong spatial correlations are presented among closely-packed antenna elements, so the channel information is expected to show sparsity (with only a few non-zero elements in the signal vector) under certain transformations.

FIG. 1 illustrates a general channel information feedback scenario for a Massive-MIMO communication system. Referring to FIG. 1, a Massive-MIMO communication system 10 includes a transmitter 11 and a receiver 12. Both transmitter 11 and the receiver 12 are wireless communication devices. For example, the transmitter 11 could be a base station, and the receiver 12 could be a mobile station. However, the present disclosure is not limited thereto.

Referring to FIG. 1, the transmitter 11 can transmit radio signals to the receiver 12 through a MIMO channel 13. The MIMO channel 13 can be characterized by a channel correlation matrix or a MIMO spatial channel matrix (denoted as H). The receiver 12 includes at least a transceiver module 120, a channel estimator 121 and a baseband processor 122. The transceiver module 120 is connected to the channel estimator 121 and the baseband processor 122, and is configured for receiving signals from a transmitter and feeding back information to the transmitter. The channel estimator 121 estimates the channel correlation matrix H from pilot signals or reference signals received from the transmitter 11, and provides the channel correlation matrix H to the transmitter 11 through a feedback link 14, and also provides the channel correlation matrix H to the baseband processor 122 for processing the radio signals from the transmitter 11. The feedback link 14 can be a reverse link in one of the MIMO channel 13 or could be a wireless communication channel different from the MIMO channel 13.

An efficient channel feedback method for Massive-MIMO schemes should enable the channel information to be significantly compressed without sacrificing the performance of data transmission. It is noted that the term "channel information" refers to either the MIMO spatial channel matrix (denoted as H), or any spatial signature that can be extracted from the channel correlation matrix H. For instance, the beamformer for eigen-beamforming can be calculated by undertaking a singular value decomposition (SVD) on the channel correlation matrix H in the following equation (1):

$$H = U\Sigma V^H \qquad (1),$$

where U and V are unitary matrices, while $\Sigma$ is a diagonal matrix. The non-zero elements of $\Sigma$ represent singular values of the channel correlation matrix H. In cases of rank-1 (single data stream) beamforming, the necessary information required by the transmitter is the first column of the matrix V (denoted as $V_1$). Hence, "channel information" in this particular case (referring to the beamforming) is referred to $V_1$ in lieu of the full channel matrix H. All the proposed channel information feedback methods in this disclosure are applicable to both the MIMO channel matrix H and the beamforming vector $V_1$.

As aforementioned, the proposed channel information feedback methods in this disclosure can be used as the feedback mechanism of different type of MIMO channel information, such as the MIMO channel matrix H, or the beamforming vector $V_1$. Unless otherwise specified, the following descriptions of exemplary embodiments focus on the feedback of the MIMO channel matrix H in the rest of the disclosure. All entries of the MIMO channel matrix H are complex numbers. It is noted that all steps (unless otherwise specified) are proceeded separately for the real part and the imaginary part of the MIMO channel matrix H.

Figure 2A:
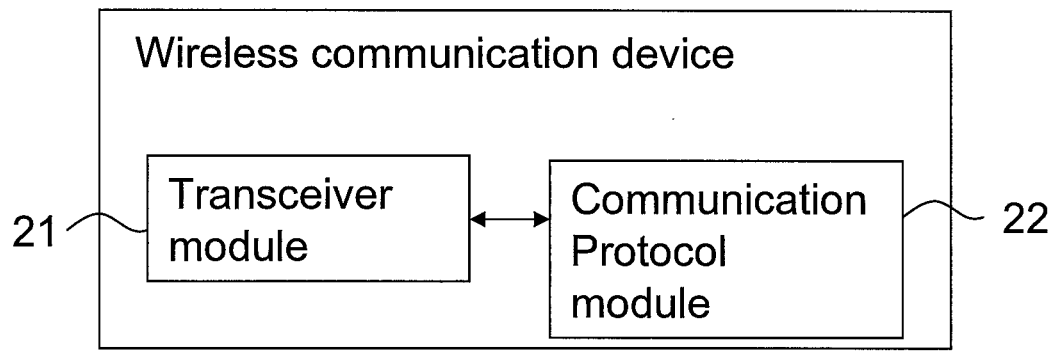
FIG. 2A is a functional block diagram illustrating a wireless communication device according to an exemplary embodiment.

FIG. 2A is a functional block diagram illustrating a wireless communication device according to an exemplary embodiment. Referring to FIG. 2A, a wireless communication device 20 can be a wireless communication device at a transmitting end (a transmitter), and can include at least a transceiver module 21 and a communication protocol module 22. The transceiver module 21 is configured for transmitting signals to another wireless communication device and receiving signals from another wireless communication device. The communication protocol module 22 is connected to the transceiver module 21, might include at least a processor, and is configured for recovering MIMO channel matrix H based on signals received from the another wireless communication device. In addition, the wireless communication device 20 can include other components (not illustrated) such as a processor module, a memory module, and an antenna module for processing signals from other wireless communication devices.

Figure 2B:
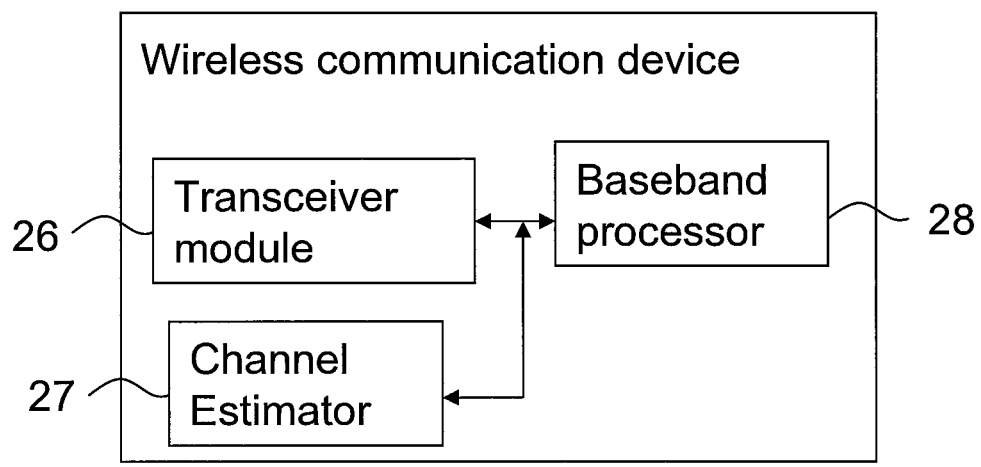
FIG. 2B is a functional block diagram illustrating another wireless communication device according to an exemplary embodiment.

FIG. 2B is a functional block diagram illustrating another wireless communication device according to an exemplary embodiment. A wireless communication device 25 can be a wireless communication device at a receiving end (a receiver), and can include at least a transceiver module 26, a channel estimator 27, and a baseband processor 28. The transceiver module 26 is configured for receiving signals from the another wireless communication device at transmitting end (such as the wireless communication device 20), and transmitting signals to the another wireless communication device. The channel estimator 27 is connected to the transceiver module 26 and the baseband processor 28, and is configured for estimating MIMO channel matrix H based on pilot signals or reference signals received from the transmitter. In addition, the channel estimator 27 provides the estimated MIMO channel matrix H to the baseband processor 28.

The baseband processor 28 is connected to the transceiver module 26 and the channel estimator 27, and configured for reducing dimension of the MIMO channel matrix H, or vectorizes the MIMO channel matrix H into a vector h. Further, the baseband processor 28 is configured for reducing the dimension of the vector h by multiplying the vector h with a random matrix, and feeding back the vector h to the another wireless communication device at the transmitting end. In addition, the wireless communication device 25 can include other components (not illustrated) such as a processor module, a memory module and an antenna module for processing signals from one or more wireless communication devices.

[First Exemplary Embodiment]

Figure 3A:
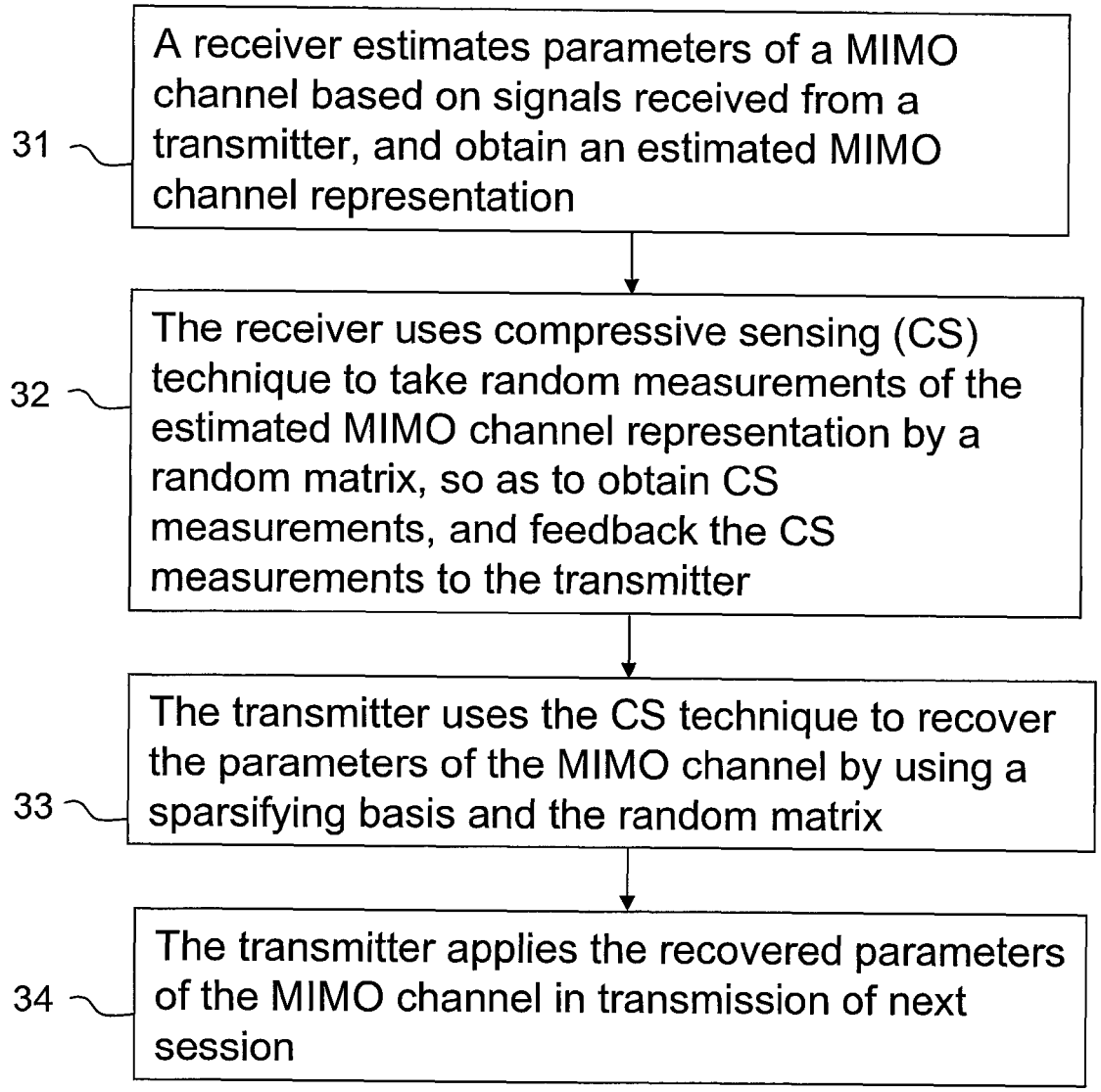
FIG. 3A illustrates a flowchart of a channel information feedback method for multi-antenna system according to a first exemplary embodiment.

The first exemplary embodiment provides a compressive sensing-based MIMO channel information feedback method. FIG. 3A illustrates a flowchart of a channel information feedback method for multi-antenna system according to a first exemplary embodiment. The channel information feedback method for multi-antenna system illustrated in FIG. 3A provides a generalized compressive sensing-based channel information feedback method for multi-antenna system.

Referring to FIG. 2A, FIG. 2B and FIG. 3A, the generalized channel information feedback method for multi-antenna system starts from step 31, in which a receiver estimates (e.g., the wireless communication device 25 makes its channel estimator 27 to estimate) parameters of a MIMO channel based on signals received from a transmitter (e.g., the wireless communication device 20), and obtain an estimated MIMO channel representation. It is noted that, in practical implementations, the estimated MIMO channel representation includes a real part representation and an imaginary part representation. The receiver (e.g., the wireless communication device 25) can separately process the real part representation and the imaginary part representation in following steps 32-33, while the transmitter (e.g., the wireless communication device 20) can separately process the real part representation and the imaginary part representation fed back from the receiver, and finally combine the real part representation and the imaginary part representation to form the recovered parameters of the MIMO channel That is, the receiver obtains compressive sensing measurements of real part of the estimated MIMO channel and compressive sensing measurements of imaginary part of the estimated MIMO channel.

In step 32, the receiver uses compressive sensing (CS) technique to take random measurements of the estimated MIMO channel representation by a random matrix, so as to obtain CS measurements, and feedback the CS measurements to the transmitter. As mentioned previously, the receiver uses compressive sensing (CS) technique to take random measurements of the real part representation and the imaginary part representation by the random matrix, and then obtains real part compressive sensing measurements and imaginary compressive sensing measurements, where the CS measurements comprises the real part compressive sensing measurements and imaginary compressive sensing measurements. In addition, the CS measurements fed back to the transmitter from the receiver includes the real part compressive sensing measurements and imaginary compressive sensing measurements.

In step 33, the transmitter (e.g., the wireless communication device 20) uses the CS technique to recover the parameters of the MIMO channel by using a sparcifying basis and the random matrix (both known the transmitter and the receiver in advance). In practical implementation, the transmitter separately uses the compressive sensing on the real part representation and the imaginary part representation with the N×N sparcifying basis and the M×N pre-configured random matrix to respectively recover real part parameters and imaginary part parameters of the MIMO channel, and then combine the real part parameters and the imaginary part parameters of the MIMO channel as the recovered MIMO channel (or the recovered parameters of the MIMO channel).

In step 34, the transmitter applies the recovered parameters of the MIMO channel in transmission of next session. The channel information feedback method for multi-antenna system can be continuously executed from the step 31 to the step 34. Throughout the present disclosure, the concept of the receiver separately processing real part of MIMO channel representation and imaginary part of MIMO channel representation, and the receiver feeding back both the real part and the imaginary part of MIMO channel representation to the transmitter, and the transmitter separately recovering the real part parameters and the imaginary part parameters of the MIMO channel based on the real part and the imaginary part of MIMO channel representation fed back from the receiver, and finally combine the recovered real part parameters and the recovered imaginary part parameters of the MIMO channel into the recovered parameters of the MIMO channel can be applied to embodiments illustrated in FIG. 3B, FIG. 6A, FIG. 6C, FIG. 6D, FIG. 6E, FIG. 8 and FIG. 9.

Figure 3B:
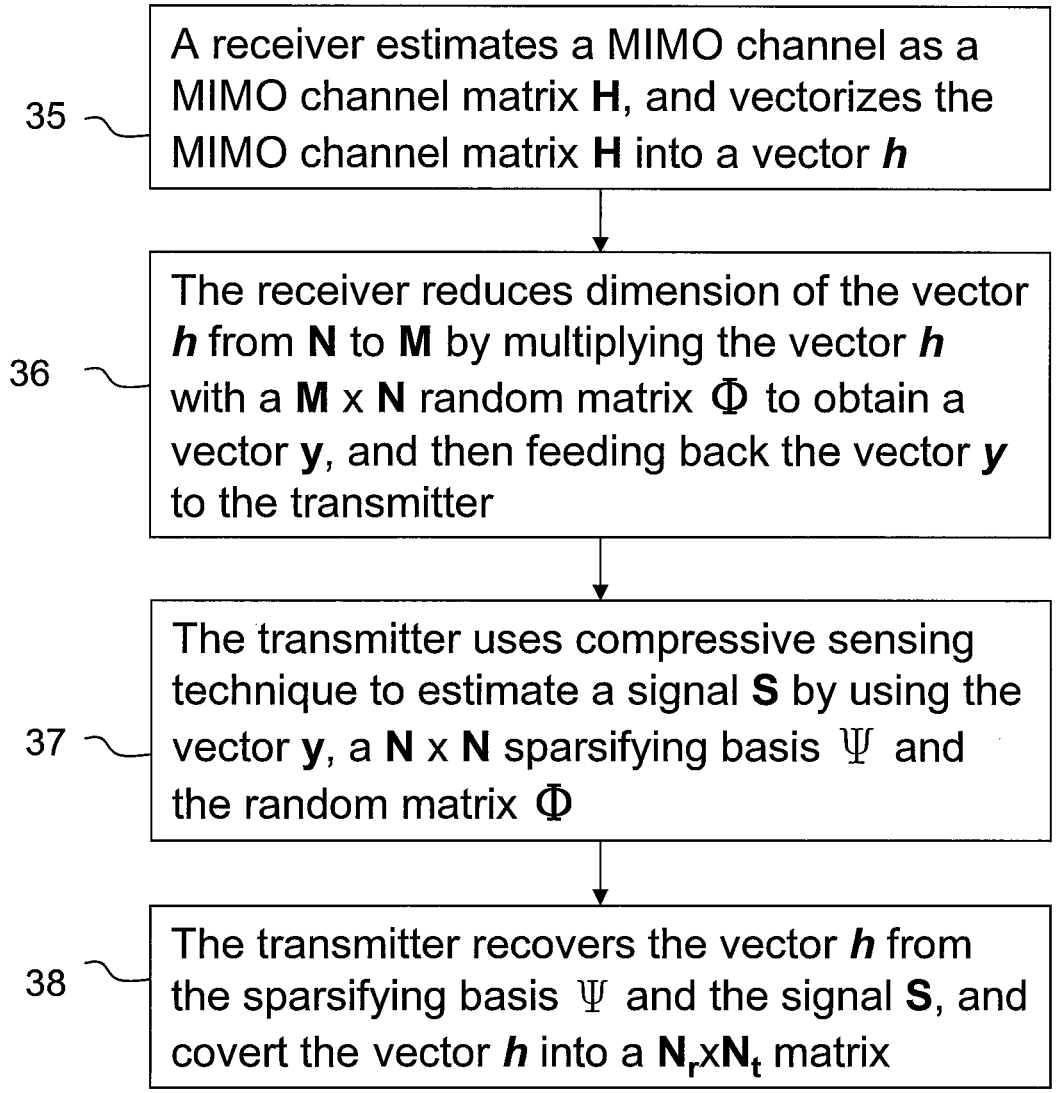
FIG. 3B illustrates a flowchart of another channel information feedback method for multi-antenna system according to a first exemplary embodiment.

FIG. 3B illustrates a flowchart of another channel information feedback method for multi-antenna system according to the first exemplary embodiment. In fact, the channel information feedback method for multi-antenna system illustrated in FIG. 3B provides a more detailed technical disclosure of the channel information feedback method illustrated in FIG. 3A.

Referring to FIG. 3B, step 35 to step 37 respectively provide detailed implementation technical disclosure of the step 31 to the step 33 in FIG. 3A. The channel information feedback method for multi-antenna system starts from the step 35, in which a receiver (e.g., the wireless communication device 25) estimates a MIMO channel as a MIMO channel matrix H, and vectorizes the MIMO channel matrix H into a vector h. In particular, once the MIMO spatial channel, H, is estimated at the receiver (i.e., the wireless communication device 25), the MIMO spatial channel, H is firstly vectorized by the baseband processor 28 into a vector h as following equation (2):

$$h = \text{vec}(H) \qquad (2)$$

It is noted that the MIMO spatial channel, H, is a $N_r \times N_t$ channel matrix as the transmitter has $N_t$ antennas and the receiver has $N_r$ antennas respectively. Thus, by denoting $N = N_r \times N_t$, h is a N×1 vector. It is noted that the step 35 could be skipped if any column of the matrix V (rather than the MIMO spatial channel H) is being sent by feedback, as the signal is already in vector form in the first place.

In the step 36, prior to sending feedback, the dimension of the vector h is reduced (compressed) from N to M (M<<N) by multiplying the vector h with a M×N random matrix (which is pre-configured and the M×N random matrix is known at both the transmitter and the receiver) denoted as a random matrix $\Phi$ in following equation (3):

$$y = \Phi h \qquad (3),$$

where the vector y is a M×1 vector. The step 36 essentially generates M of compressive sensing (CS) measurements via random projections. Then, the vector y is fed back to the transmitter (e.g., the wireless communication device 20) from the receiver (i.e., the wireless communication device 25) on a dedicated feedback link 14. In other words, in the step 36, the baseband processor 28 reduces dimension of the vector h from N to M by multiplying the vector h with a N×M random matrix $\Phi$ to obtain the vector y, and then feeding back the vector y to the transmitter (i.e., the wireless communication device 20).

In the step 37, once the vector y is acquired by the transmitter (i.e., the wireless communication device 20), a sparse vector, S, could be recovered by an optimization procedure (executed in the communication protocol module 22), and the optimization procedure is shown in following equations (4) and (5):

$$\hat{S} = \arg\min \|S'\|_1 \qquad (4),$$

$$\Theta S' = y \qquad (5),$$

where $\Theta = \Phi 105$, and a matrix $\Psi$ represents a N×N sparcifying basis (or a N×N sparcifying matrix). Typical examples of the N×N sparcifying basis $\Psi$ include signal-independent basis such as Discrete Fourier Transform (DFT) matrix, Discrete Cosine Transform (DCT) matrix, and Wavelet matrix. However, the present disclosure is not limited thereto, and the N×N sparcifying basis $\Psi$ could also be a signal-dependent basis such as Kahrunen-Loeve Transform (KLT) matrix. In general, $\Psi$ is capable of revealing the sparse representation of the signal (S) in other domains, and the signal (S) is shown in following equation (6):

$$S = \Psi h \qquad (6),$$

The optimization procedure of solving S can be attacked by various algorithms that have been designed to solve underdetermined algebra problems, such as a linear programming, a basic pursuit (BP), an orthogonal matching pursuit (OMP), and so forth. In other words, in the step 37, the transmitter (i.e., the wireless communication device 20) has its communication protocol module to use compressive sensing technique to estimate a signal S by using the vector y, the N×N sparcifying basis $\Psi$ and the random matrix $\Phi$. In step 38, once the signal (S) is estimated, the channel vector h can be recovered at the transmitter by an inverse transform as shown in following equation (7):

$$h = \Psi^H S, \qquad (7),$$

Then, the inverse operation of the step 35 is carried out by converting the channel vector h into a $N_r \times N_t$ matrix, which is the MIMO channel matrix H recovered by the transmitter. In other words, the transmitter (i.e., the wireless communication device 20) has its communication protocol module to recover the vector h from the sparsifying basis $\Psi$ and the signal S, and then convert the vector h into a $N_r \times N_t$ matrix, which is the recovered MIMO channel matrix H. In addition, the channel information feedback method for multi-antenna system illustrated in FIG. 3B can be followed by the step 34, which is omitted in FIG. 3B.

Figure 4:
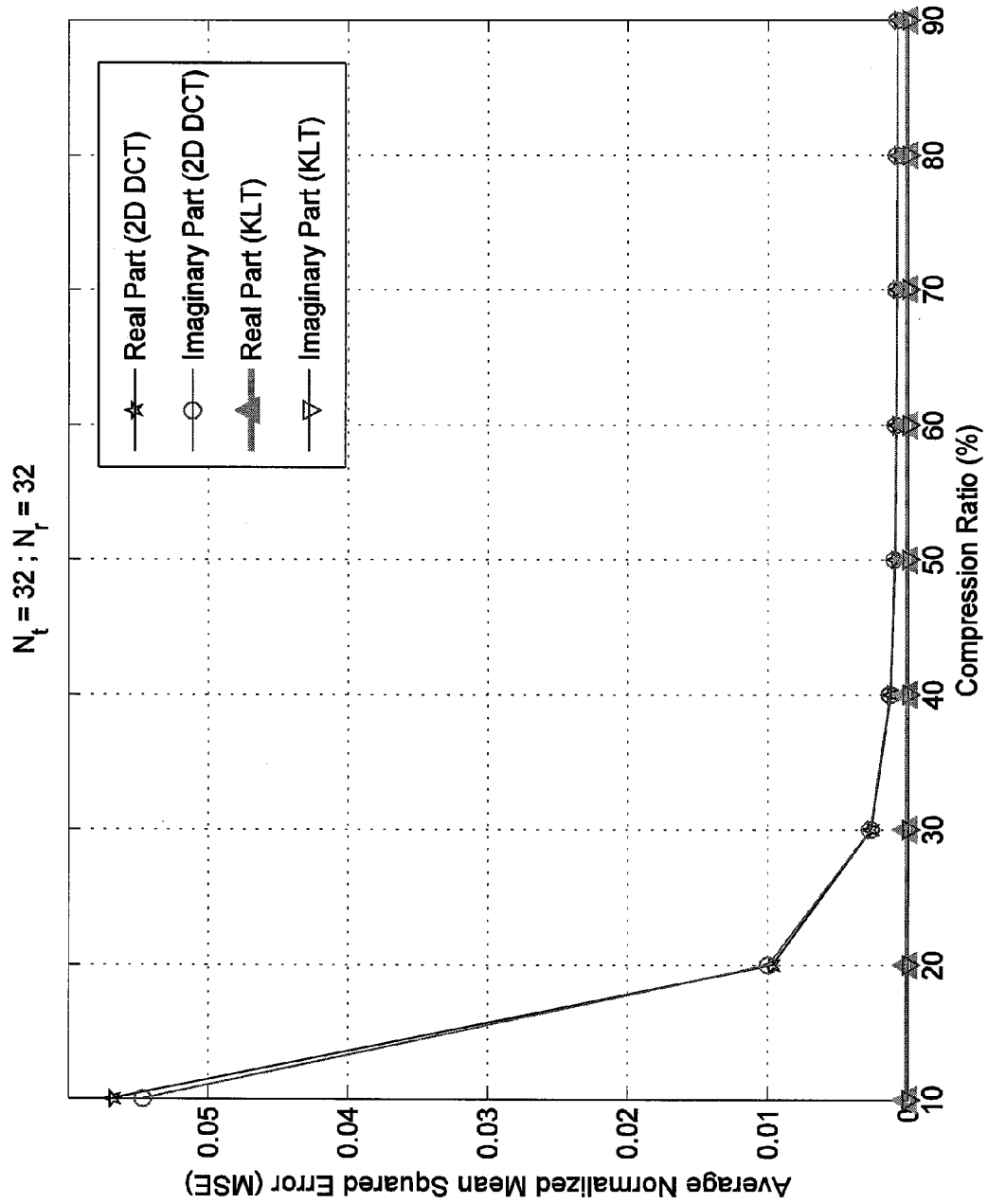
FIG. 4 is a schematic diagram illustrates simulation results of the channel information feedback method for multi-antenna system according to an exemplary embodiment.

FIG. 4 is a schematic diagram illustrates simulation results of the channel information feedback method for multi-antenna system according to an exemplary embodiment. It is noted that the real part and the imaginary part of the MIMO channel matix H are computed separately in the simulations, and the simulations is performed with $N_t = 32$ and $N_r = 32$, for the proposed channel information feedback method when two-dimensional (2D) DCT are used as the N×N sparcifying basis $\Psi$, or the KLT matrix are used for the N×N sparcifying basis $\Psi$. The vertical axis of FIG. 4 is average normalized mean squared error (MSE) of the decoded signals at the receiver as compared with the actual signals transmitted from the transmitter. The horizontal axis of FIG. 4 is compression ratio. It is noted that the compression ratio, ξ, is defined as following equation (8):

$$\xi = M/N \qquad (8)$$

Hence, the compression ratio, ξ, is directly related to the value of M, or the size of the vector y.

The simulation in FIG. 4 demonstrates that the performance for the proposed channel information feedback method when the 2D DCT are used as N×N sparcifying basis $\Psi$ has average normalized MSE gradually decreases as the compression ratio value is increased. The KLT matrix is presumed to have an optimal performance, and the simulation in FIG. 4 shows that the average normalized MSE for the proposed channel information feedback method when KLT matrix are used for the N×N sparcifying basis $\Psi$ are used as N×N sparcifying basis $\Psi$ always has zero MSE regardless of the compression ratio values.

[Second Exemplary Embodiment]

The second exemplary embodiment provides an adaptive MIMO channel information feedback method. Based on the channel information compression technique described in the aforementioned first exemplary embodiment, a feedback protocol with an adaptive compression ratio is developed. Although a larger size of the vector y (corresponding to a larger value of M) allows the transmitter (e.g., the wireless communication device 20) to recover the MIMO channel matrix H with higher accuracy, it also aggravates the feedback burden. Therefore, it is designed in the second exemplary embodiment that the value of M (or the compression ratio) can be adjusted in accordance to the instantaneous channel gain (of the MIMO channel) detected by the receiver (e.g., the wireless communication device 25). In addition, the value of M should be identical for processing the real part representation and the imaginary part representation of the estimated MIMO channel representation. This processing principle can be applied to following embodiments illustrated in FIG. 5 and FIG. 6A-FIG. 6E.

For example, in varied embodiments of the second exemplary embodiment, the determination of the instantaneous channel gain can be determination of cyclic redundancy check (CRC) results at the receiver. Alternatively, the determination of the instantaneous channel gain can be determination of instantaneous forward channel strength. Then, the value of M (or the compression ratio) could be determined by the receiver based on error rate (e.g., the rate of CRC failures) or the instantaneous forward channel strength.

When the presence of transmission errors is detected (for instance, CRC failure) at the receiver, the size of the vector y is increased before it is sent via feedback link. It is noted that different values of M correspond to different random matrices Φ with different sizes, and the transmitter should be able to determine (or be notified by the receiver) which random matrix to be used in a channel recovery algorithm, based on the size of the vector y that it has received on feedback link.

Figure 5:
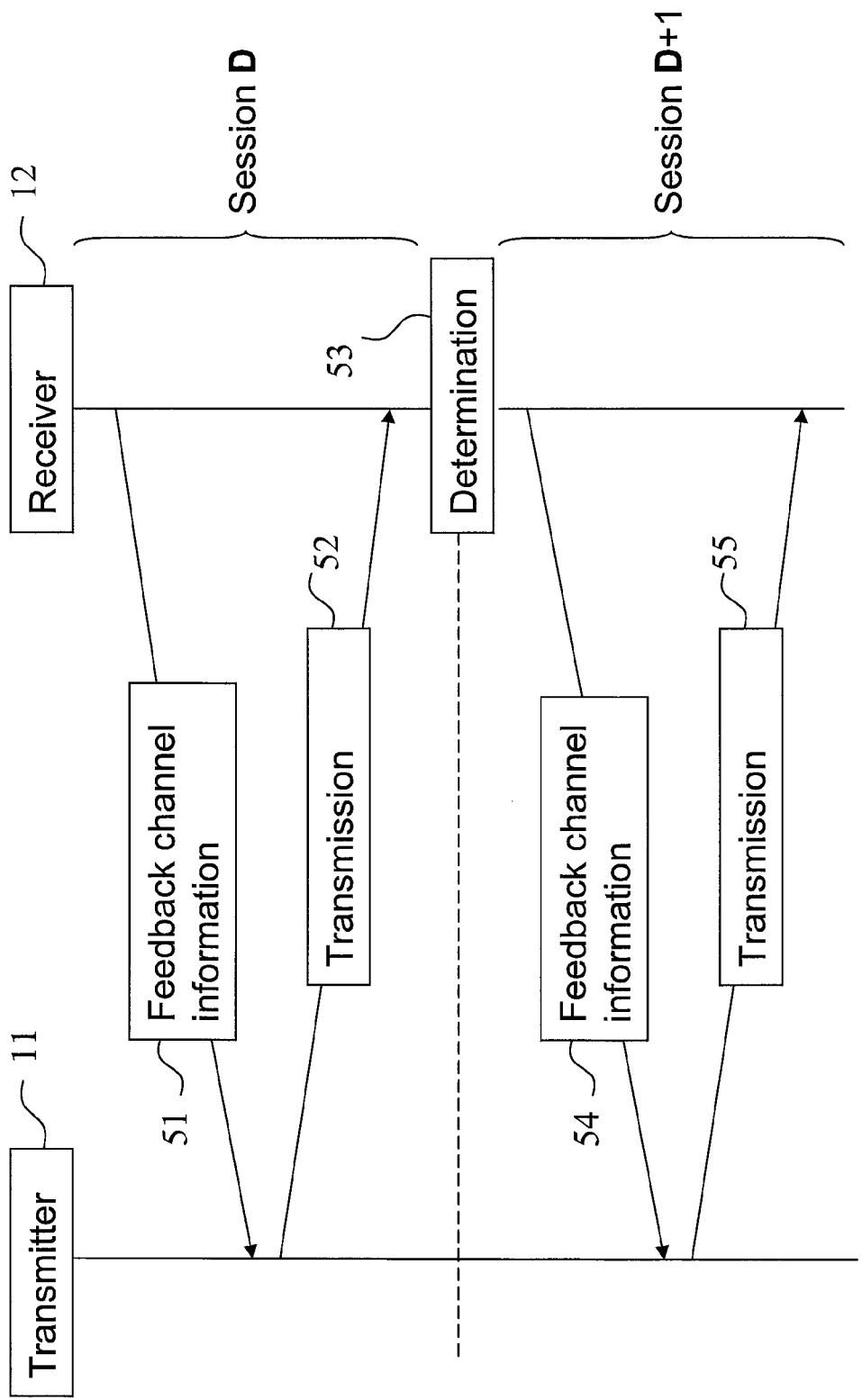
FIG. 5 illustrates a channel information feedback scenario for a multi-antenna communication system.

This adaptive feedback protocol enables the transmitter to recover the channel more accurately once the error(s) has been detected in the previous session, and a more precise beamforming configuration can therefore be applied. FIG. 5 illustrates a channel information feedback scenario for a multi-antenna communication system. Referring to FIG. 5, in a session D, the receiver 12 firstly feeds back channel information to the transmitter 11 in step 51, and then the transmitter 11 transmits signals based on the recovered MIMO channel matrix (or the recovered MIMO channel information) in step 52. Before the next session, which is a session D+1, the receiver 12 makes a determination in step 53, where the determination could be first to determine the instantaneous channel gain (of the MIMO channel) detected by the receiver 12, and then determine the value of M (or the compression ratio) in accordance to the instantaneous channel gain. The receiver 12 could adjust the value of M (or the compression ratio) in the session D+1. When the value of M (or the compression ratio) is modified in the session D+1, the receiver 12 should also notify the transmitter 11, for example, by an index via the feedback link 14, where the index clearly indicates the value of M.

In the session D+1peating the same pattern, the receiver 12 feeds back channel infonnation to the transmitter 11 in step 54, and then the transmitter 11 transmits signals based on the recovered MIMO channel matrix (or the recovered MIMO channel information) in step 55. When the value of M is modified in the session D+1, the transmitter 11 could determine the modified value of M (or the modified compression ratio) by an index received from the receiver 12, and should determine a new sparcifying basis Ψ corresponding to the value of M (or the compression ratio) according to the received index, and then recover the MIMO channel matrix by using the new sparcifying basis Ψ in the step 55.

Figure 6A:
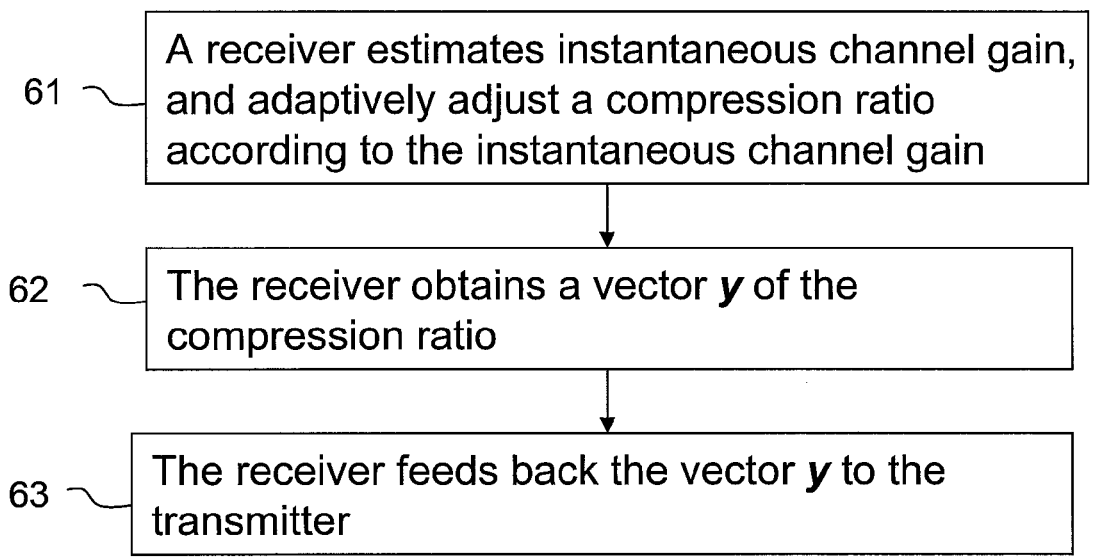
FIG. 6A is a flowchart illustrating an adaptive MIMO channel information feedback method according the second exemplary embodiment.

FIG. 6A is a flowchart illustrating an adaptive MIMO channel information feedback method according the second exemplary embodiment. The adaptive MIMO channel information feedback method illustrated in FIG. 6A provides a detailed implementation of the step 36 in FIG. 3B. Referring to both FIG. 2B and FIG. 6A, in step 61, the wireless communication device 25 (an example of the receiver 12) uses its channel estimator 27 to estimate instantaneous channel gain, obtain the instantaneous channel gain, and adaptively adjust a compression ratio (or the value of M) according to the instantaneous channel gain. In step 62, the wireless communication device 25 uses the baseband processor 28 to obtain a vector y of the compression ratio (or the value of M). In step 63, the wireless communication device 25 feeds back the vector y to the transmitter 11. It is noted that when the value of M is modified in the session D+1, the wireless communication device 25 should notify the transmitter 11 (or feedback an index to the transmitter 11), then the transmitter 11 should uses its communication protocol module (or baseband processor) to determine a new sparcifying basis Ψ corresponding to the value of M (or the compression ratio) according to the received index, and then recover the MIMO channel matrix by using the new sparcifying basis Ψ after receiving the vector y.

Figure 6B:
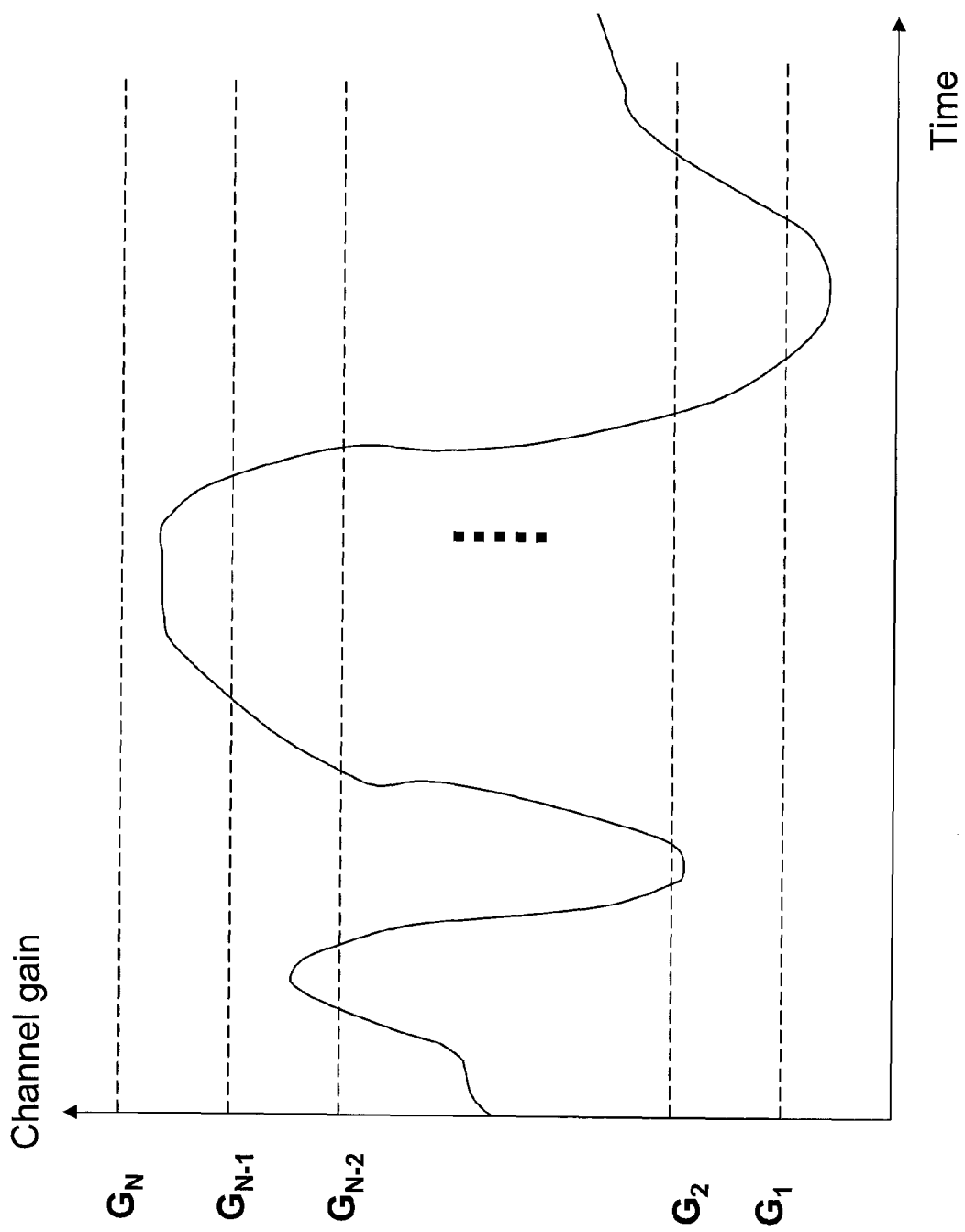
FIG. 6B is a schematic diagram illustrating multi-level thresholds of instantaneous channel gain according to an exemplary embodiment.

FIG. 6B is a schematic diagram illustrating multi-level thresholds of instantaneous channel gain according to an exemplary embodiment. The instantaneous channel gain detected by the wireless communication device 25 varies with time and have different channel gain values at different detection time. The baseband processor 28 of the wireless communication device 25 can compare the estimated instantaneous channel gain with the multi-level thresholds shown in FIG. 6B.

FIG. 6B provides merely an example and is not intended to limit the present disclosure. For example, when the wireless communication device 25 determines that the estimated instantaneous channel gain is between $G_N$ and $G_{N-1}$, then the baseband processor 28 can determine the estimated instantaneous channel gain as $G_{N-1}$. Further, the baseband processor 28 can use Table I (pre-configured in a memory unit coupled to the baseband processor 28 in the wireless communication device 25) shown below to determine a corresponding compression ratio of 10%. It is noted that the value of M can be directly converted from the compression ratio. The adaptive MIMO channel information feedback method repeats the step 61 to the step 63 according to the aforementioned procedures to estimate instantaneous channel gain in each session and then determine the compression ratio according to the estimated instantaneous channel gain in each session.

TABLE I

| Channel gain | Compression ratio |
| --- | --- |
| $G_N$ | 5% |
| $G_{N-1}$ | 10% |
| $G_{N-2}$ | 15% |
| . | . |
| . | . |
| $G_2$ | 55% |
| $G_1$ | 65% |

Figure 6C:
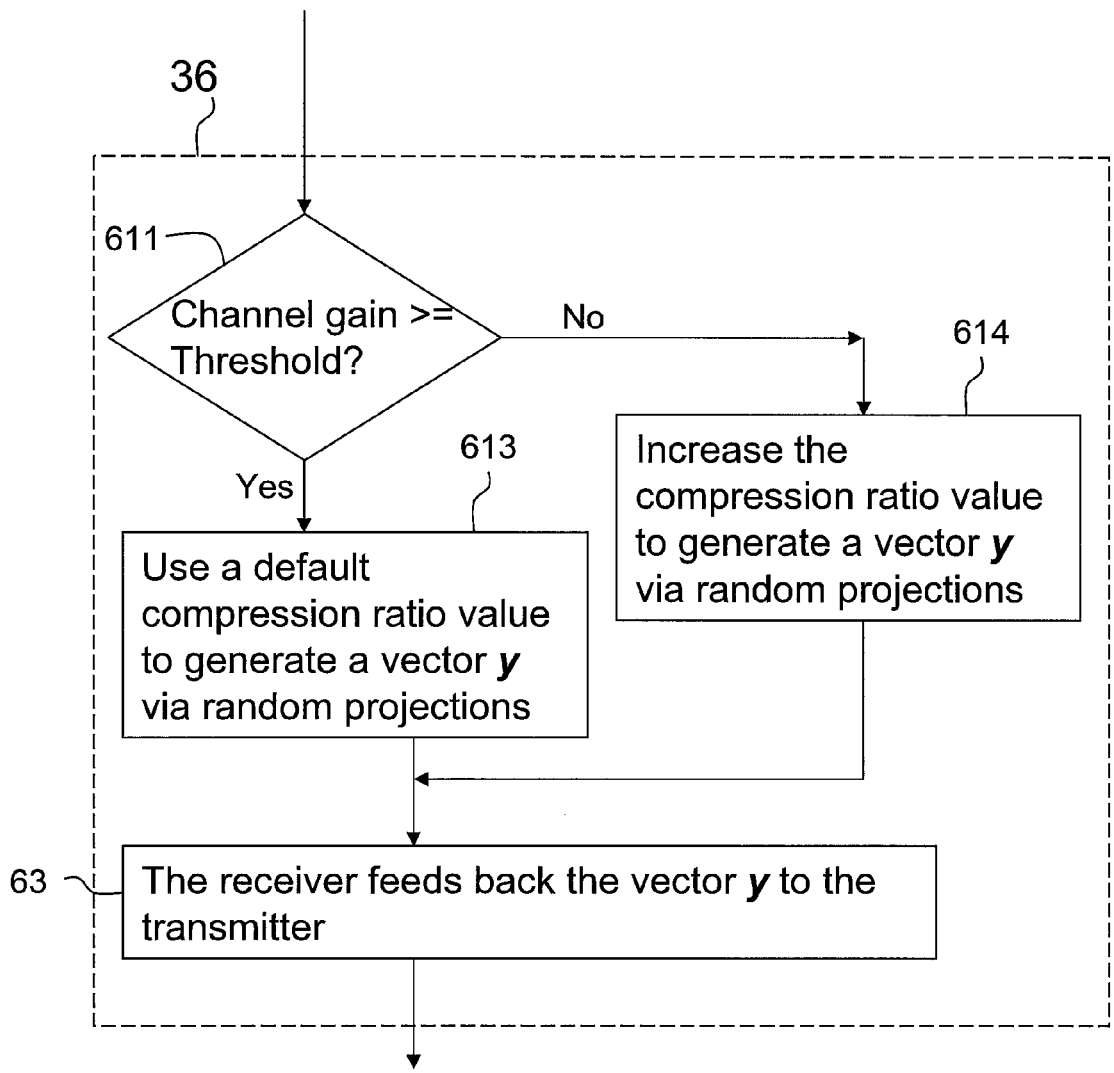
FIG. 6C is a flowchart illustrating an adaptive MIMO channel information feedback method according the second exemplary embodiment.

FIG. 6C is a flowchart illustrating an adaptive MIMO channel information feedback method according the second exemplary embodiment. In the adaptive MIMO channel information feedback method shown in FIG. 6C, a binary threshold of instantaneous channel gain is used instead of the multi-level thresholds; however, the concept of adaptively adjust the compression ratio according to the estimated instantaneous channel gain is similar to that described in FIG. 6A.

Referring to both 2B and FIG. 6C, step 611 to step 614 provide a detailed technical disclosure of the step 61 and the step 62. In step 611, the wireless communication device 25 (corresponding to the receiver 12) uses its channel estimator 27 to estimate instantaneous channel gain, obtain the instantaneous channel gain, and uses the baseband processor 28 to compare the instantaneous channel gain with a pre-configured threshold. When the instantaneous channel gain is greater than or equal to the pre-configured threshold, step 613 is executed after the step 611; when the instantaneous channel gain is less than the pre-configured threshold, step 614 is executed after the step 611.

In the step 613, the baseband processor 28 uses a default compression ratio value to generate a vector y via random projections. The approach of generating the vector y via the random projections according to the compression ratio value can be referred to descriptions of the equation (3) and the step 36.

In the step 614, the baseband processor 28 increases the compression ratio value to generate a vector y via random projections. After the step 613 or the step 614, the step 63 is executed, and the detailed technical disclosure of the step 63 can be referred to FIG. 6A.

Figure 6D:
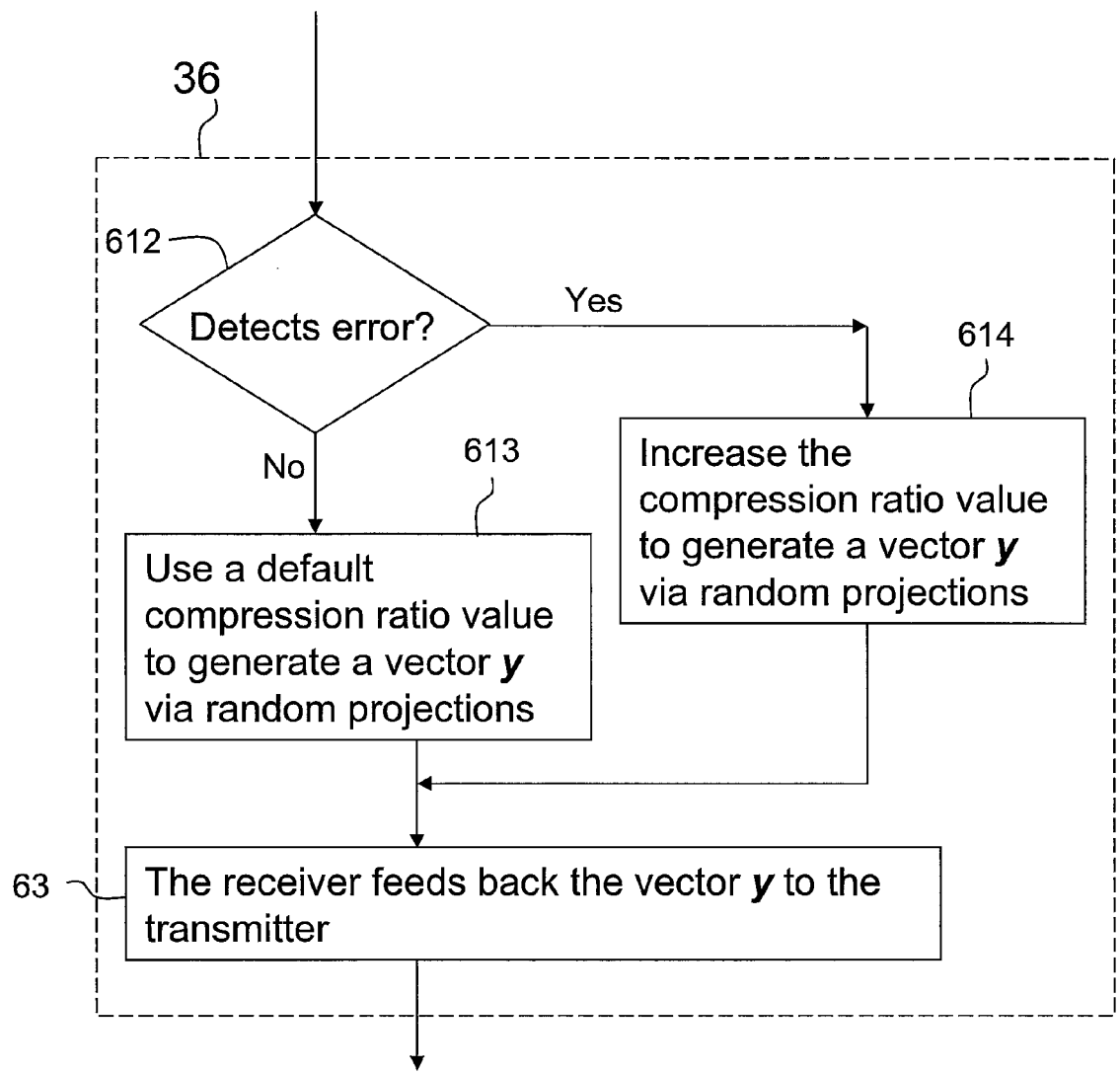
FIG. 6D is a flowchart illustrating an adaptive MIMO channel information feedback method according the second exemplary embodiment.

FIG. 6D is a flowchart illustrating an adaptive MIMO channel information feedback method according the second exemplary embodiment. In the adaptive MIMO channel information feedback method shown in FIG. 6D, a binary threshold of instantaneous channel gain is used instead of the multi-level thresholds. However, the concept of adaptively adjust the compression ratio according to the estimated instantaneous channel gain is similar to that described in FIG. 6A.

Referring to both 2B and FIG. 6D, in step 612, the wireless communication device 25 (corresponding to the receiver 12) uses its baseband processor 28 to detect any error. When there is an error detected, step 613 is executed after the step 612; when there is no error detected, step 614 is executed after the step 612.

In the step 613, the baseband processor 28 uses a default compression ratio value to generate a vector y via random projections. In the step 614, the baseband processor 28 increases the compression ratio value to generate a vector y via random projections. After the step 613 or the step 614, the step 63 is executed, and the detailed technical disclosure of the step 63 can be referred to FIG. 6A.

Figure 6E:
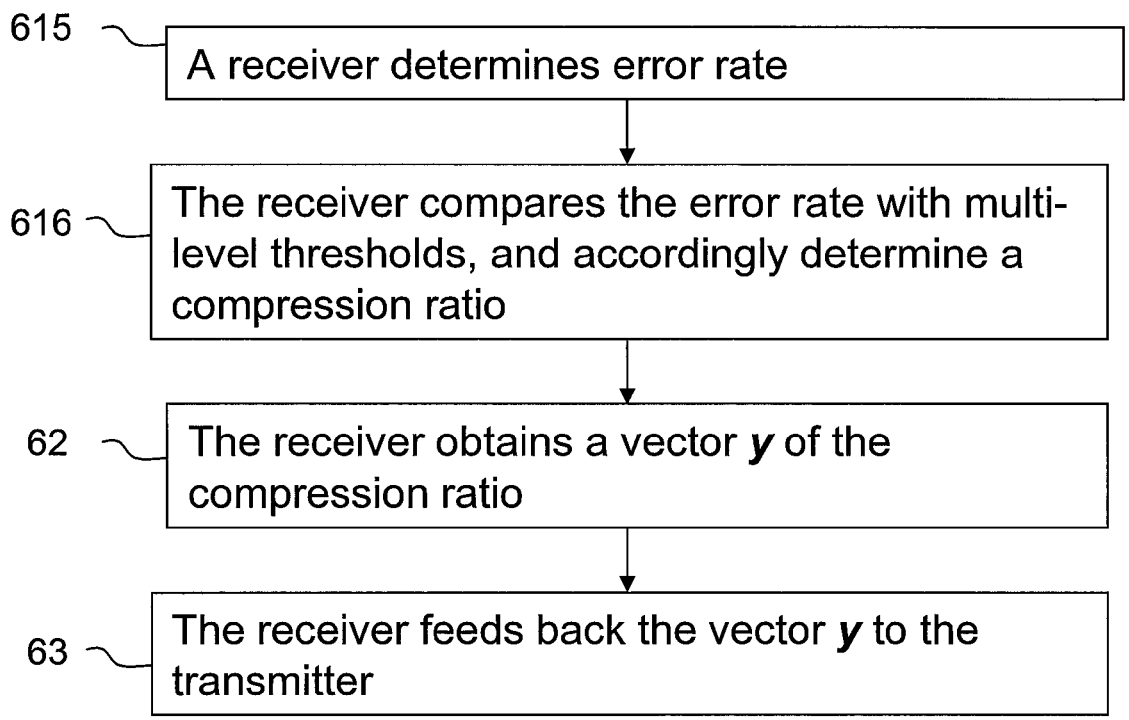
FIG. 6E is a flowchart illustrating an adaptive MIMO channel information feedback method according the second exemplary embodiment.

FIG. 6E is a flowchart illustrating an adaptive MIMO channel information feedback method according the second exemplary embodiment. The adaptive MIMO channel information feedback method illustrated in FIG. 6E is a more generalized channel information feedback method in comparison with that illustrated in FIG. 6D. Referring to FIG. 6E, step 615 and step 616 provided more detailed technical disclosure of the step 61. In step 615, the wireless communication device 25 (corresponding to the receiver 12) uses its baseband processor 28 to determine error rate, where the error rate can be calculated based on signals received from a transmitter, CRC of the received frame, packet error rate, or symbol error rate. Alternatively, the error rate can refer to the mean squared error. In step 616, the wireless communication device 25 uses its baseband processor 28 to compare the error rate with pre-configured multi-level thresholds and accordingly determines a compression ratio. For example, the multi-level thresholds of error rates can be similar to that (with the vertical axis changed from channel gain to error rate) shown in FIG. 6B, and the pre-configured multi-level thresholds have corresponding compression ratio values similar as those shown in Table I. After executing the step 615 and the step 616, the step 62 and the step 63 are performed, and the technical disclosures of the step 62 and the step 63 can be referred to FIG. 6B.

In another embodiments, the adaptive MIMO channel information feedback method can include: the wireless communication device 25 uses its baseband processor 28 to calculate a mean squared error of the third vector deviated from the first vector; the baseband processor 28 determines whether the mean squared error is greater than a pre-determined threshold; when the mean squared error is greater than or equal to the pre-determined threshold, the wireless communication device 25 feeds back the first vector; and when the mean squared error is less than the pre-determined threshold, the wireless communication device 25 feeds back only non-zero elements of the sparse vector to the transmitter.

Figure 7:
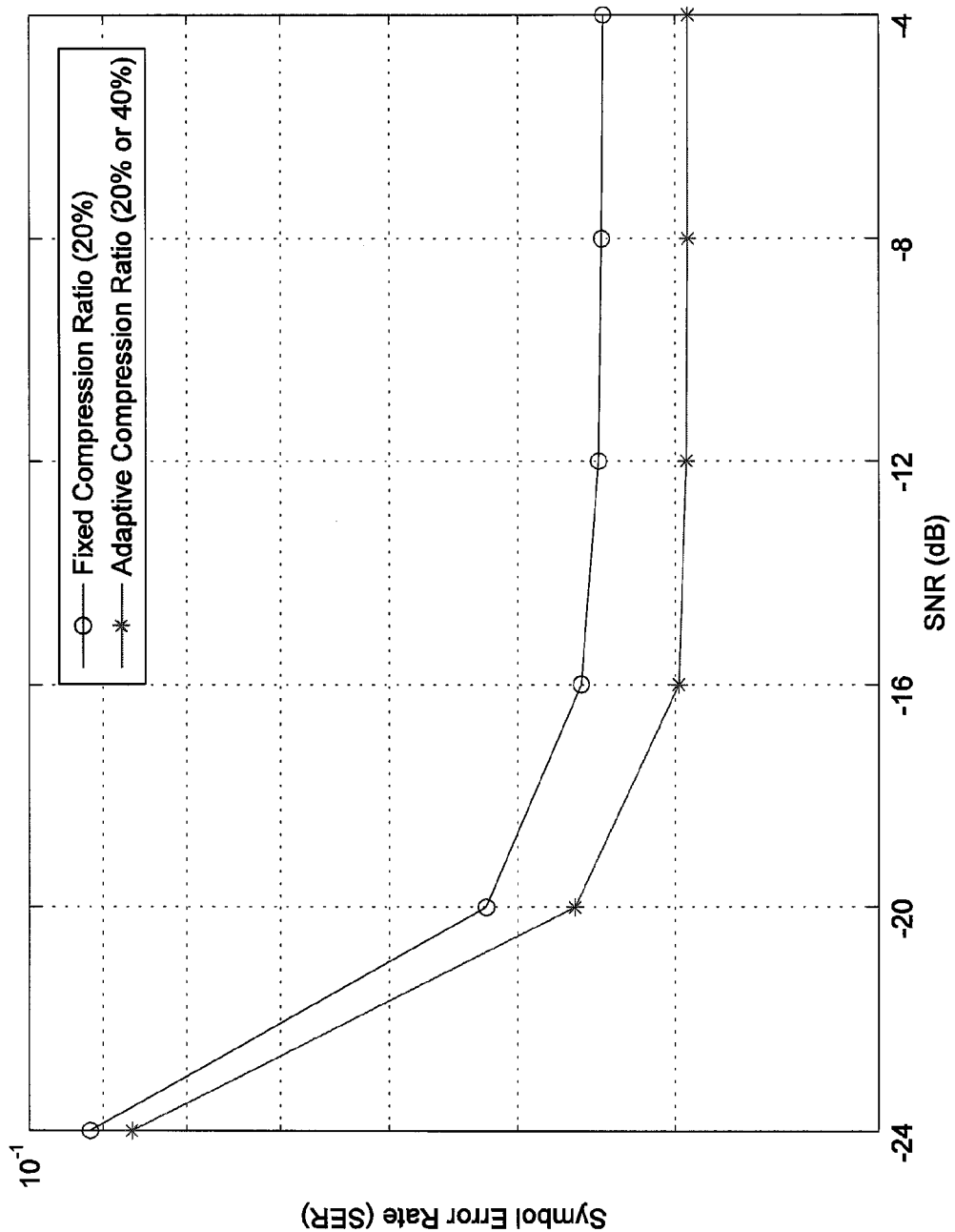
FIG. 7 is a schematic diagram illustrating simulation results of the channel information feedback method with adaptive compression ratio according the second exemplary embodiment.

FIG. 7 is a schematic diagram illustrating simulation results of the channel information feedback method with adaptive compression ratio according the second exemplary embodiment. The simulation results of the adaptive compression ratio (varied among 20% or 40%) in FIG. 7 are compared with a channel information feedback method with fixed compression ratio (being configured to 20%). The horizontal axis of FIG. 7 is signal-to-noise (SNR) ratio in dB, while the vertical axis of FIG. 7 is symbol error rate (SER). It can be shown that the channel information feedback method with adaptive compression ratio has better performance in comparison to the channel information feedback method with fixed compression ratio.

[Third Exemplary Embodiment]

The third exemplary embodiment provides a MIMO channel information feedback method based on sparcifying-basis switching. As mentioned in Proposal 1, the sparcifying basis,$\Psi$ used by the transmitter for channel recovery can be either signal-independent basis (for examples, DFT or DCT), or signal-dependent basis (i.e., KLT). The choice of the type of the sparcifying basis $\Psi$ affects the number of measurements (the value of M or the size of y) that the optimization algorithm requires for accurate channel information recovery. In particular, when KLT basis is applied to the channel information feedback method, the value of M can be decreased to as small as 2 or 4, which leads to a very efficient channel information feedback performance. As mentioned previously, the value of M should be identical for processing the real part representation and the imaginary part representation of the estimated MIMO channel representation. This processing principle can be applied to various embodiments in following descriptions.

When the reliable information on KLT basis is available at the transmitter 11, the receiver 12 could simply perform KLT on the channel information to obtain a very sparse vector with only one non-zero element (and the position of such non-zero element can be known to both the transmitter 11 and the receiver 12 due to the nature of KLT optimization algorithm); by sending a value and an index (position) of such non-zero element to the transmitter 12 through feedback link, channel information could be recovered at the transmitter 11 by inverse-KLT process. However, this is a paradox as the KLT basis is calculated as the eigenvectors of the correlation matrix of the signal that is to be recovered.

For slow-varying channels, however, it can be reasonably assumed that channel correlation matrix (or the MIMO channel) does not change dramatically over time. Thus, there is proposed a feedback protocol for this specific scenario in the third exemplary embodiment. The MIMO channel information feedback method based on sparcifying-basis switching in the third exemplary embodiment basically include following step 1 and step 2.

In the step 1, for the first session, the receiver 12 should feedback sufficient measurements (when the value of M is large enough). Then, based on these measurements, the transmitter 11 should be able to accurately recover the channel H with high probability. This step 1 is essentially the same as the first exemplary embodiment, except that the receiver 12 and the transmitter 11 should also both proceed recovery algorithm, as well as calculate an estimated KLT basis (denoted as $Q_{est}$) from the recovered MIMO channel matrix H, where a KLT basis Q is the eigenvector of a matrix W, which is expressed in following equation (9).

$$W = h^H h \quad (9)$$

In other words, the matrix W is a vector multiplication of a Hermitian vector of the vector h with the vector h. The transmitter 11 should send data in the second session using configurations based on the recovered MIMO channel information.

In the step 2, upon the reception of the transmitted data in the second session, the presence of transmission error is checked by the mechanism such as CRC at the receiver 12. When the receiver 12 detects any error, the proposed channel information feedback method returns to execute the step 1; otherwise, the receiver 12 should first emulate the recovery capability of the transmitter 11, by checking whether the estimated KLT basis $Q_{est}$ computed earlier is able to provide a sufficiently accurate recovery of the latest channel information (i.e., the receiver 12 inspects if the resultant mean square error (MSE) is lower than a pre-determined threshold level, T).

The receiver 12 could carry out KLT on the latest MIMO channel information to obtain S, and inverse transform S by the $Q_{est}$ computed in the preceding signaling interval (i.e., in the first session). Then, the receiver 12 can check MSE by comparing the inverse-transformed signal with the actual channel information. When the receiver 12 determines that the resultant MSE is lower than the pre-determined threshold, the receiver 12 can further determine that estimated KLT basis $Q_{est}$ computed at the transmitter 11 during last feedback session is not yet severely outdated, and the receiver 12 could merely feedback the only non-zero element of S.

Alternatively, the receiver 12 could perform the optimization algorithm (such as OMP) itself with very few measurements (a small portion, or the first m elements, of the vector y), and then the receiver 12 can check the MSE. When the receiver 12 determines that the resultant MSE is lower than the pre-determined threshold, the receiver 12 can further determine that the estimated KLT basis $Q_{est}$ computed at the transmitter 11 during the last feedback session is not obsolete and still valid, so the receiver 12 could transmit only the first m measurements to the transmitter 11 via the feedback link, and the transmitter 11 may use the estimated KLT basis $Q_{est}$ that it has obtained earlier as well as the first m rows of the random matrix Φ to carry out a channel recovery procedure.

When the receiver 12 determines that the resultant MSE is higher than the pre-determined threshold level, the receiver should feedback sufficient measurements so the transmitter 11 may recover the MIMO channel information using fixed Fourier basis (DFT or DCT), and both the transmitter 11 and the receiver 12 should update the estimated KLT basis $Q_{est}$ in accordance to the new MIMO channel matrix H.

Figure 8:
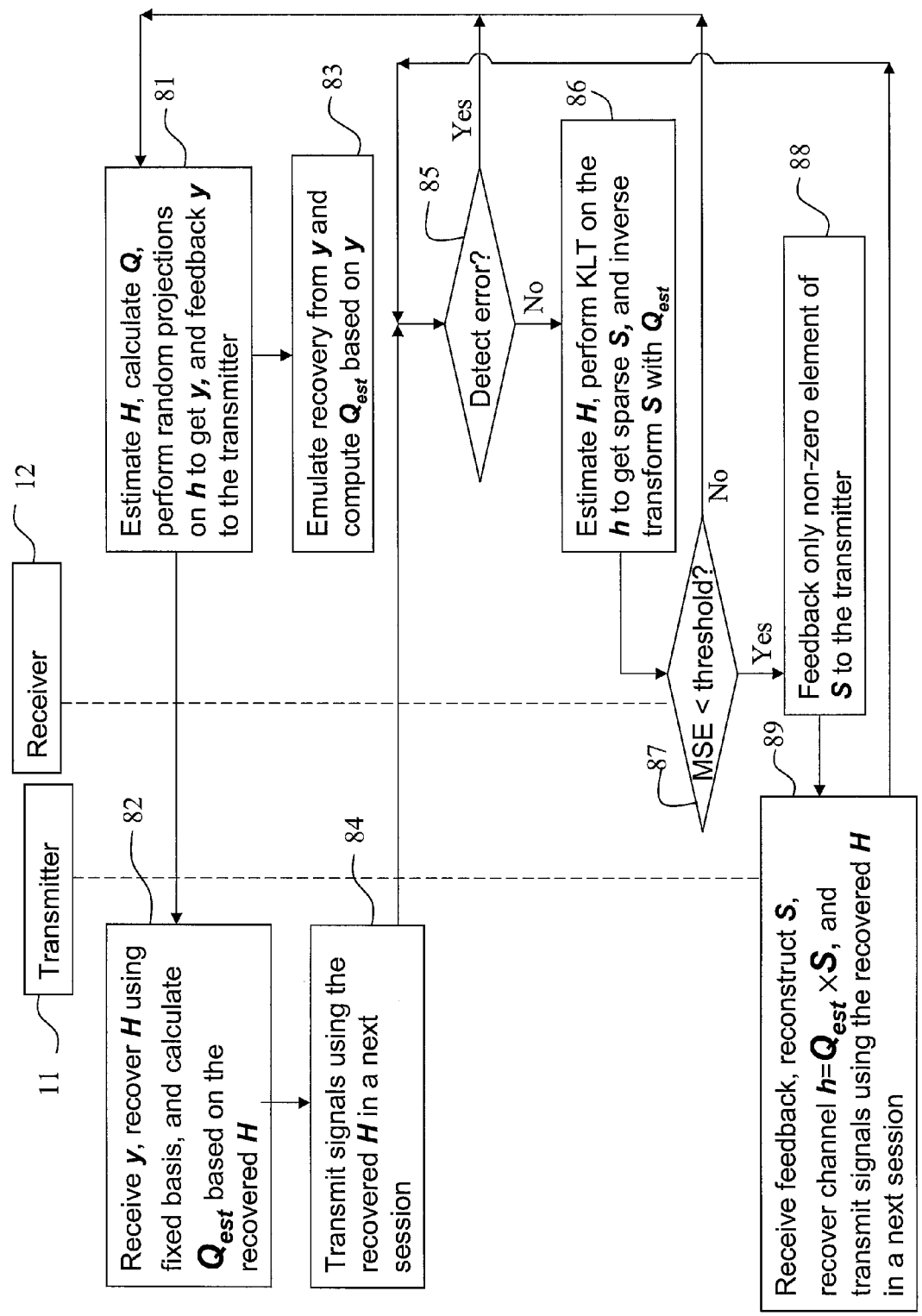
FIG. 8 is flowchart illustrating a channel information feedback method based on sparcifying-basis switching according to the third exemplary embodiment.

FIG. 8 is flowchart illustrating a channel information feedback method based on sparcifying-basis switching according to the third exemplary embodiment. The proposed channel information feedback method illustrated in FIG. 8 is based on the main process illustrated in FIG. 3A and FIG. 3B. Referring to FIG. 8, procedures to be executed is separated to some procedures being executed at the transmitter 11 and the rest procedures being executed at the receiver 12. In step 81, the receiver 12 (or wireless communication device 25) uses its channel estimator 27 to estimate MIMO channel and then obtain the MIMO channel matrix H, and uses its baseband processor 28 to calculate a KLT basis Q, which is calculated by the baseband processor 28 as eigenvectors of the MIMO channel matrix H (or the channel correlation matrix). In the step 81, the baseband processor 28 also performs random projections on vector h (vectorized from the MIMO channel matrix H) to obtain the vector y, and feedbacks the vector y to the transmitter 11 (or the wireless communication device 20). Also, the KLT basis Q are eigenvectors of the matrix W expressed in the equation (9).

In step 82, the wireless communication device 20 receives the vector y from its transceiver module 21, and uses its communication protocol module 22 to recover the MIMO channel information (represented by the MIMO channel matrix H) using fixed basis (e.g., DFT or DCT), and calculate the KLT basis $Q_{est}$ based on the recovered MIMO channel matrix H.

In step 83, the wireless communication device 25 uses its baseband processor 28 to emulate a channel recovery process from the vector y, and then compute an estimated version of KLT basis $Q_{est}$ based on the vector y. The emulation in the step 83 here refers to performing, at the baseband processor 28, the same process in the step 82 to recover the MIMO channel information (represented by the MIMO channel matrix H) using fixed basis (e.g., DFT or DCT), and calculate an estimated KLT basis $Q_{est}$ based on the recovered MIMO channel matrix H. It is noted that the step 83 can be executed straight after the step 81, or before transmission of the vector y to the transmitter 11.

In step 84, the communication protocol module 22 transmits signals using the recovered MIMO channel matrix H through the transceiver module 21 in a next session.

In step 85, the wireless communication device 25 uses its baseband processor 28 to detect any error in the signals received from the wireless communication device 20. When the baseband processor 28 detects any error in the signals received from the wireless communication device 20, it is returned to execute the step 81; otherwise, step 86 is executed after the step 85.

In step 86, the wireless communication device 25 uses the baseband processor 28 to estimate a MIMO channel matrix H, perform a KLT on a vector h (vectorized from the estimated MIMO channel matrix H) to obtain a sparse vector S', and perform inverse KLT transform the sparse vector S' with the estimated KLT basis $Q_{est}$ (computed in the step 83) to obtain a vector ĥ.

In step 87, the wireless communication device 25 uses the baseband processor 28 to calculate error metrics between the vector ĥ and the vector h (obtained in the step 81), for example, the mean squared error (MSE) of the vector ĥ deviated from the vector h. Also, the baseband processor 28 further compares the MSE of the vector ĥ deviated from the vector h with a pre-determined threshold. When the MSE is less than the pre-determined threshold, step 88 is executed after the step 87; when the MSE is greater than or equal to the pre-determined threshold, it is returned to execute the step 81.

In step 88, the baseband processor 28 feeds back only non-zero element of the sparse vector S' to the transmitter 11. Since the sparse vector S' is obtained by performing KLT, there will be just 1 non-zero element in the sparse vector S', and both the transmitter 11 and the receiver 12 can know the position of the non-zero element in advance.

In step 89, the wireless communication device 20 receives only non-zero element of the sparse vector S' fed back from the receiver 12, the wireless communication device 20 uses the communication protocol module 22 to reconstruct the sparse vector S', and recover the MIMO channel information (represented by the vector h) based on the estimated KLT basis $Q_{est}$ and the sparse vector S' according to following equation (10), and further transmits signals using the recovered MIMO channel matrix H through the transceiver module 21 in a next session. It is returned to execute the step 85 after the step 89.

$$h = Q_{est} \times S' \quad (10)$$

Figure 9:
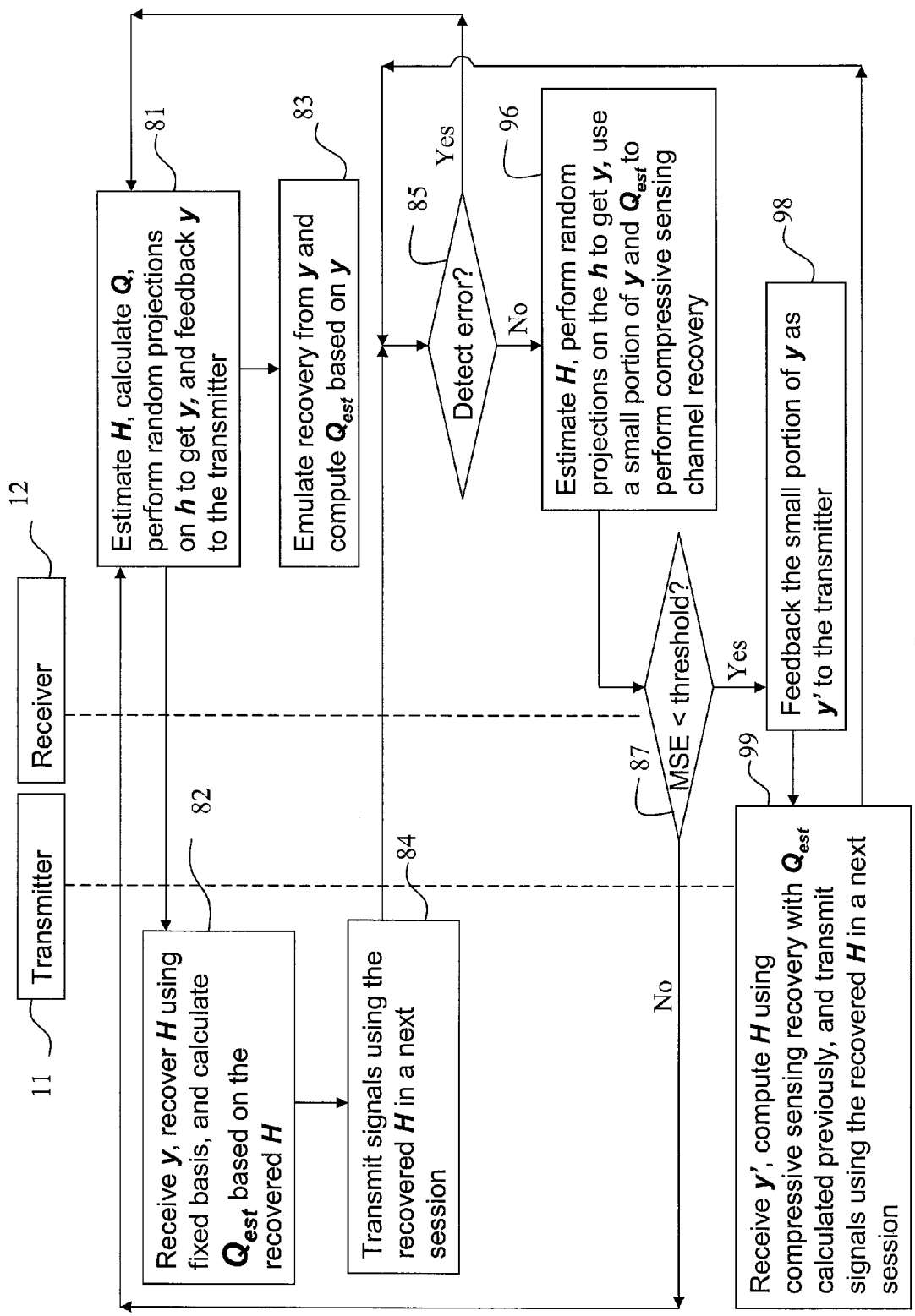
FIG. 9 is flowchart illustrating a channel information feedback method based on sparcifying-basis switching according to the third exemplary embodiment.

FIG. 9 is flowchart illustrating a channel information feedback method based on sparcifying-basis switching according to the third exemplary embodiment. The channel information feedback method based on sparcifying-basis switching illustrated in FIG. 9 is based on the main process illustrated in FIG. 3A and FIG. 3B. Referring to FIG. 9, procedures to be executed is separated to some procedures being executed at the transmitter 11 and the rest procedures being executed at the receiver 12. Also, the step 81 to the step 85 in FIG. 9 are the same as corresponding steps 81-85 in FIG. 8, so the technical details thereof are not repeated here.

Referring to FIG. 9, in step 96, the wireless communication device 25 uses the baseband processor 28 to estimate a MIMO channel matrix H, perform random projections on a vector h (vectorized from the estimated MIMO channel matrix H) to obtain a new vector y, and perform a channel recovery process based on compressive sensing technique by using a small portion of the vector y and the estimated KLT basis $Q_{est}$ (computed in the step 83, and used as a sparcifying basis in the step 96) to obtain a vector ĥ according to the equation (7).

In step 87, the wireless communication device 25 uses the baseband processor 28 to calculate error metrics between the vector ĥ and the vector h (obtained in the step 81), for example, the mean squared error (MSE) of the vector ĥ deviated from the vector h. Also, the baseband processor 28 further compares the MSE of the vector ĥ deviated from the vector h with a pre-determined threshold. When the MSE is less than the pre-determined threshold, step 98 is executed after the step 87; when the MSE is greater than or equal to the pre-determined threshold, it is returned to execute the step 81.

In step 98, the baseband processor 28 merely feeds back the small portion of the vector y as a vector y' to the transmitter 11.

In step 99, the wireless communication device 20 receives a vector y' fed back from the receiver 12, the wireless communication device 20 uses the communication protocol module 22 to compute the MIMO channel matrix H by performing channel recovery process based on compressive sensing technique with the estimated KLT basis $Q_{est}$ (calculated previously in the step 82), and further transmits signals using the recovered MIMO channel matrix H through the transceiver module 21 in a next session. It is returned to execute the step 85 after the step 99.

Figure 10:
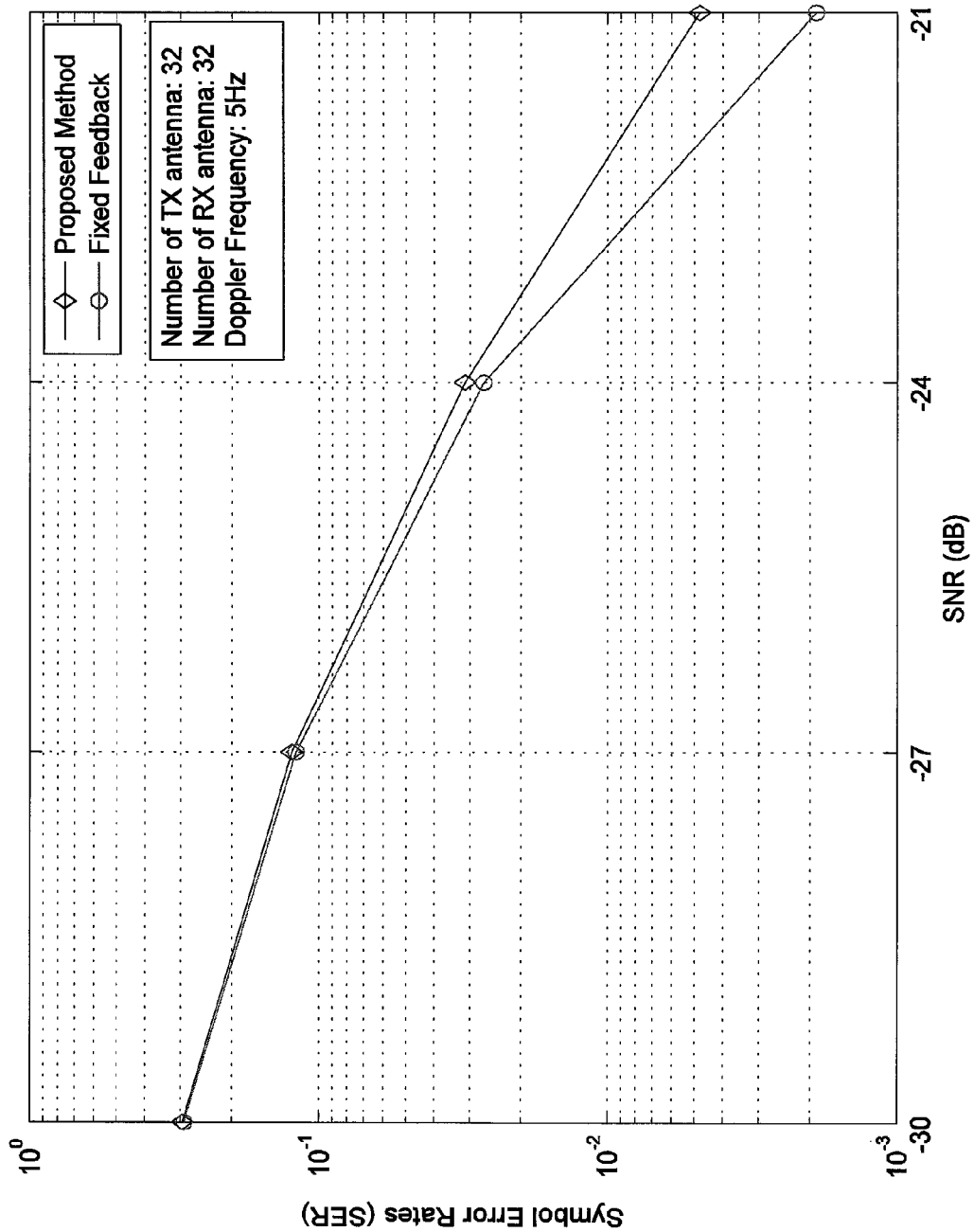
FIG. 10 is a schematic diagram illustrating simulation results of a channel information feedback method based on sparcifying-basis switching in terms of symbol error rate.

FIG. 10 is a schematic diagram illustrating simulation results of a channel information feedback method based on sparcifying-basis switching in terms of symbol error rate. Referring to FIG. 10, the horizontal axis is SNR in dB, the vertical axis is SER, and the simulation is performed with $N_t=32$ and $N_r=32$ along with doppler frequency of 5 Hz, so variations of MIMO channel are quite slow. The simulation is performed for both the proposed channel information feedback method based on sparcifying-basis switching and a channel information feedback method with fixed feedback. The fixed feedback here refers to always feeding back a complete vector y (calculated based on fixed sparcifying-basis) instead of switching the sparcifying-basis. It is shown in FIG. 10 that the performance in terms of SER for proposed channel information feedback method is still quite similar to the fixed feedback scheme.

Figure 11:
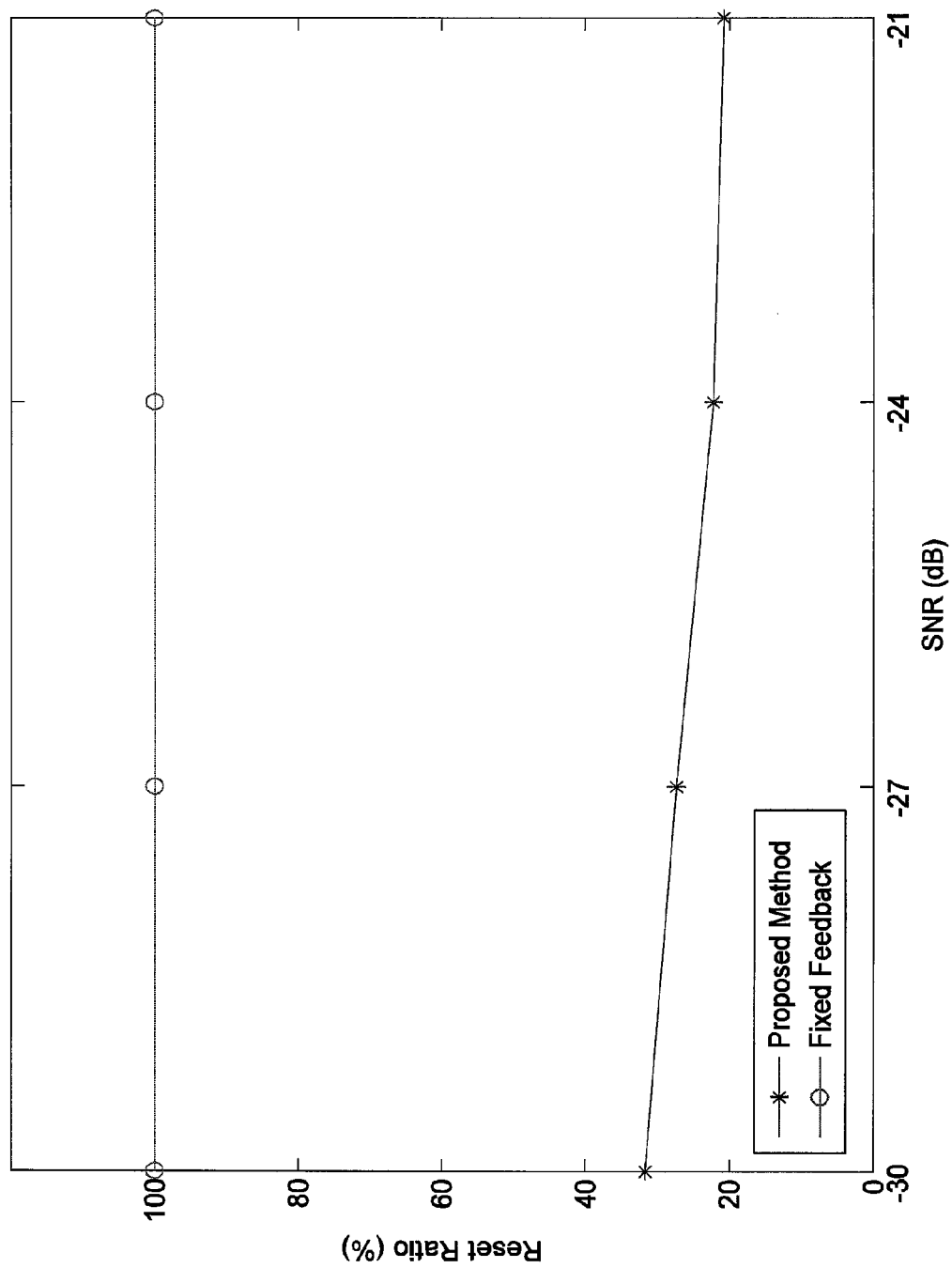
FIG. 11 is a schematic diagram illustrating simulation results of a channel information feedback method based on sparcifying-basis switching in terms of reset ratio.

FIG. 11 is a schematic diagram illustrating simulation results of a channel information feedback method based on sparcifying-basis switching in terms of reset ratio. The reset ratio refers to the situation that the receiver 12 detects error of the signals based on the recovered MIMO channel matrix H using the estimated KLT basis $Q_{est}$, or determine MSE (of the recovered MIMO channel information based on the estimated KLT basis $Q_{est}$, and the actual MIMO channel information) greater than a pre-determined threshold, so the channel information feedback method is required to return to the step 81 in FIG. 8 and FIG. 9. It is shown in FIG. 10 that the performance in terms of reset ratio for proposed channel information feedback method based on sparcifying-basis switching is still low and approaching 20% as the value of SNR is increased, which is better than the performance of the channel information feedback method with fixed feedback. The channel information feedback method with fixed feedback always feedback the complete vector y so the reset ratio thereof is always 100% regardless of SNR values.

In summary, according to the exemplary embodiments of the disclosure, a channel information feedback method for multi-antenna system, and a wireless communication device using the same method are proposed. In one embodiment, prior to sending back channel information, a receiver estimates the channel and multiplies the vectorized channel with a random matrix to generate compressed feedback content. Upon receiving the compressed feedback content at a transmitter, the channel information can be restored with signal recovery algorithms of compressive sensing technique. In the other embodiment, the proposed method further adaptively adjusts compression ratio of the compressed feedback content in accordance to the prevailing channel quality, and thus achieves better performance. Further, for slow-varying MIMO channels, there is proposed another channel information feedback method which switches between a fixed sparcifying-basis and a signal-dependent sparcifying-basis, and thus can result in more efficient feedback.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A channel information feedback method, adapted to a multi-antenna system, comprising:

estimating, at a wireless communication device, parameters of a MIMO channel as a MIMO channel matrix based on signals received from a transmitter, and vectorizing the MIMO channel matrix into a first vector as an estimated MIMO channel representation;

applying compressive sensing technique, at the wireless communication device, to take random measurements of the estimated MIMO channel representation by a pre-configured random matrix, so as to obtain compressive sensing measurements; and feeding back the compressive sensing measurements to the transmitter from the wireless communication device, wherein the step of applying the compressive sensing technique to take random measurements of the estimated MIMO channel representation by the pre-configured random matrix comprises: reducing, at the wireless communication device, dimension of the first vector from N to M by multiplying the first vector with a M×N pre-configured random matrix to obtain a second vector, wherein N>M and M and N are positive integers;

wherein the step of feeding back the compressive sensing measurements to the transmitter comprises: transmitting, at the wireless communication device, the second vector to the transmitter;

wherein before the step of reducing dimension of the first vector from N to M by multiplying the first vector with a M×N pre-configured random matrix to obtain the second vector, the channel information feedback method further comprises:

determining, at the wireless communication device, error rate based on the signals received from the transmitter;

comparing, at the wireless communication device, the error rate with pre-determined multi-level thresholds; and determining, at the wireless communication device, a compression ratio corresponding to the value of M, in accordance to the comparison result of the error rate and the pre-determined multi-level thresholds.

2. The method of claim 1, wherein the estimated MIMO channel representation comprises a real part representation and an imaginary part representation, and the step of applying compressive sensing technique to take random measurements of the estimated MIMO channel representation by the pre-configured random matrix comprises:

respectively applying the compressive sensing technique, at the wireless communication device, to take random measurements of the real part representation and the imaginary part representation by the pre-configured random matrix; and obtaining compressive sensing measurements of real part of the estimated MIMO channel representation and compressive sensing measurements of imaginary part of the estimated MIMO channel representation.

3. The method of claim 2, wherein before the step of reducing dimension of the first vector from N to M by multiplying the first vector with a M×N preconfigured random matrix to obtain the second vector, the channel information feedback method further comprises:

estimating, at the wireless communication device, instantaneous channel gain, and obtaining the instantaneous channel gain;

adaptively adjusting a compression ratio corresponding to a value of M, at the wireless communication device, according to the instantaneous channel gain; and obtaining, at the wireless communication devices, the second vector of the compression ratio.

4. The method of 2, further comprising:
transmitting, at the wireless communication device, an index indicating the adjusted compression ratio to the transmitter.

5. The method of 2, wherein before the step of reducing dimension of the first vector from N to M by multiplying the first vector with a M×N preconfigured random matrix to obtain the second vector, the channel information feedback method further comprises:

determining, at the wireless communication device, whether detects any error; and determining, at the wireless communication device, a compression ratio corresponding to the value of M, in accordance to the determination result of detecting any error.

6. The method of claim 2, further comprising:
calculating Kahrunen-Loeve Transform (KLT) basis of the first vector; and emulating, at the wireless communication device, a channel recovery process to obtain an estimated version of the first vector, and computing the KLT basis of the estimated version of the first vector.

7. A wireless communication device, comprising:
a transceiver module, configured for receiving signals from a transmitter and feeding back information to the transmitter;

a channel estimator, connected to the transceiver module, configured for estimating parameters of a MIMO channel as a MIMO channel matrix based on the signals received from the transmitter, and vectorizing the MIMO channel matrix into a first vector as an estimated MIMO channel representation; and a baseband processor, connected to the transceiver module and the channel estimator, configured for:
applying compressive sensing technique to take random measurements of the estimated MIMO channel representation by a random matrix, so as to obtain compressive sensing measurements, and feeding back the compressive sensing measurements to the transmitter through the transceiver module; and reducing dimension of the first vector from N to M by multiplying the first vector with a M×N random matrix to obtain a second vector, wherein N>M and M and N are positive integers; and the baseband processor is also configured for feeding back the second vector to the transmitter;

wherein before obtaining the second vector, the channel estimator is configured for estimating instantaneous channel gain, and the baseband processor is configured for adaptively adjusting a compression ratio corresponding to the value of M in accordance to the instantaneous channel gain, and obtaining the second vector under the adjusted compression ratio.

8. The wireless communication device of claim 7, wherein the estimated MIMO channel representation comprises a real part representation and an imaginary part representation, and the baseband processor is further configured for respectively applying the compressive sensing technique to take random measurements of the real part representation and the imaginary part representation by the pre-configured random matrix, and then separately obtain compressive sensing measurements of real part of the estimated MIMO channel representation and compressive sensing measurements of imaginary part of the estimated MIMO channel representation.

9. The wireless communication device of claim 8, wherein:
before obtaining the second vector, the baseband processor is configured for determining whether detect any error, and determining a compression ratio according to the determination result of detecting any error.

10. The wireless communication device of claim 8, wherein:
before obtaining the second vector, baseband processor is configured for determining error rate based on the signals received from the transmitter, comparing the error rate with predetermined multi-level thresholds, and determining a compression ratio according to the comparison result of the error rate and the pre-determined multi-level thresholds.

11. The wireless communication device of claim 8, wherein:

the baseband processor is also configured for calculating Kahrunen-Loeve Transform (KLT) basis of the first vector, reducing the dimension of the first vector from N to M by multiplying the first vector with a M×N random matrix to obtain a second vector, emulating a channel recovery process from the second vector applying compressive sensing technique to obtain an estimated version of the first vector, and then computing KLT basis of the estimated version of the first vector.

12. A channel information feedback method, adapted to a multi-antenna system, comprising:

transmitting, at a wireless communication device, signals to a receiver through a MIMO channel;

receiving, at the wireless communication device, compressive sensing measurement parameters of the MIMO channel from the receiver;

applying compressive sensing technique, at the wireless communication device, to recover the compressive sensing measurement parameters of the MIMO channel by using a N×N sparcifying basis and a M×N pre-configured random matrix, the step comprises:

applying the compressive sensing technique, at the wireless communication device, to estimate a signal by using a first vector received from the receiver, the N×N sparcifying basis and the M×N pre-configured random matrix, wherein M<N, N=Nr×Nt, Nt is the number of transmitting antennas at the wireless communication device, and Nr is the number of receiving antennas at the receiver, where M, N, Nr, and Nt are positive integers; and recovering, at the wireless communication device, a second vector from the N×N sparcifying basis and the signal, and converting the second vector into an estimated MIMO channel matrix, wherein all entries of the estimated MIMO channel matrix are parameters of the MIMO channel;

applying, at the wireless communication device, transmission parameters for a next session based on a recovered MIMO channel in transmission of signals;

receiving, at the wireless communication device, an index indicating a compression ratio associated with the first vector, from the receiver, where the compression ratio is directly corresponding to a value of M; and determining, at the wireless communication device, a dimension of the M×N pre-configured random matrix according to the compression ratio.

13. The method of claim 12, wherein the compressive sensing measurement parameters of the MIMO channel comprises a real part representation and an imaginary part representation, and the step of applying compressive sensing technique to recover the compressive sensing measurement parameters of the MIMO channel by using the N×N sparcifying basis and the M×N pre-configured random matrix comprises:

separately applying the compressive sensing technique on the real part representation and the imaginary part representation with the N×N sparcifying basis and the M×N pre-configured random matrix to respectively recover real part parameters and imaginary part parameters of the MIMO channel; and combining the real part parameters and the imaginary part parameters of the MIMO channel as the recovered MIMO channel.

14. The method of claim 12, further comprising:

calculating, at the wireless communication device, an estimated Kahrunen-Loeve Transform (KLT) basis of the recovered second vector; and when receiving only non-zero elements of a sparse vector from the receiver, the wireless communication device reconstructs the sparse vector with the non-zero elements of the sparse vector, multiplies the sparse vector by the estimated KLT basis calculated previously to recover the MIMO channel matrix, and then configures the transmission parameters for the next session based on the recovered MIMO channel matrix.

15. The method of claim 12, further comprising: calculating Kahrunen-Loeve Transform (KLT) basis as eigenvectors of the estimated MIMO channel matrix; and when receiving a small amount of the first vector from the receiver, the wireless communication device uses the compressive sensing technique to recover the MIMO channel matrix with the small amount of the first vector and the estimated KLT basis calculated previously, and then configures the transmission parameters for the next session based on the recovered MIMO channel matrix.

16. A wireless communication device, comprising:

a transceiver module, configured for transmitting signals to a receiver through a MIMO channel and receiving signals from the receiver; and a communication protocol module, connected to the transceiver module, configured for:

receiving compressive sensing measurement parameters of the MIMO channel from the receiver, applying compressive sensing technique to estimate a signal by using a first vector received from the receiver, a N×N-sparcifying basis and a M×N pre-configured random matrix, applying the compressive sensing technique to recover the parameters of the MIMO channel by using the N×N sparcifying basis and the M×N pre-configured random matrix, applying transmission parameters for a next session based on the recovered MIMO channel, wherein M<N, N=Nr×Nt, Nt is the number of transmitting antennas at the wireless communication device, and Nr is the number of receiving antennas at the receiver, where M, N, Nr, and Nt are positive integers, recovering a second vector from the N×N sparcifying basis and the signal, and then converting the second vector into an estimated MIMO channel matrix, wherein all entries of the estimated MIMO channel matrix are parameters of the MIMO channel, and receiving an index through the transceiver module from the receiver, wherein the index indicates a compression ratio associated with the first vector, and the compression ratio directly corresponding to a value of M; and the communication protocol module is configured for further determining the M×N pre-configured random matrix according to the compression ratio.

17. The wireless communication device of claim 16, wherein the compressive sensing measurement parameters of the MIMO channel comprises a real part representation and an imaginary part representation, and the communication protocol module is further configured for separately applying the compressive sensing technique on the real part representation and the imaginary part representation with the N×N sparcifying basis and the M×N pre-configured random matrix to respectively recover real part parameters and imaginary part parameters of the MIMO channel; and combining the real part parameters and the imaginary part parameters of the MIMO channel as the recovered MIMO channel.

18. The wireless communication device of claim 17, wherein:
the communication protocol module is configured for calculating an estimated Kahrunen-Loeve Transform (KL T) basis of the recovered second vector; and
when receiving only non-zero elements of a sparse vector from the receiver, the communication protocol module reconstructs the sparse vector with the non-zero elements of the sparse vector, multiplies the sparse vector by the estimated KL T basis calculated previously to recover a MIMO channel matrix, and then configures the transmission parameters for the next session based on the recovered MIMO channel matrix.

19. The wireless communication device of claim 17, wherein:
the communication protocol module is configured for calculating Kahrunen-Loeve Transform (KLT) basis as eigenvectors of the estimated MIMO channel matrix; and
when the communication protocol module receives only a small amount of the first vector fed back from the receiver, the communication protocol module uses the compressive sensing technique to recover a MIMO channel matrix with the small amount of the first vector the estimated KLT basis calculated previously, and then configures the transmission parameters for the next session based on the recovered MIMO channel matrix.

* * * * *